US 6,674,080 B2

(12) United States Patent
Trempala et al.

(10) Patent No.: US 6,674,080 B2
(45) Date of Patent: Jan. 6, 2004

(54) HANDHELD HEAT DETECTION DEVICE

(75) Inventors: Dohn J. Trempala, Corona del Mar, CA (US); Charles Greuzard, Fullerton, CA (US)

(73) Assignee: The Knox Company, Irvine, CA (US)

( * ) Notice: Subject to any disclaimer, the term of this patent is extended or adjusted under 35 U.S.C. 154(b) by 72 days.

(21) Appl. No.: 10/027,702

(22) Filed: Dec. 19, 2001

(65) Prior Publication Data

US 2002/0066858 A1 Jun. 6, 2002

Related U.S. Application Data

(62) Division of application No. 09/393,509, filed on Sep. 10, 1999, now Pat. No. 6,388,254.
(60) Provisional application No. 60/099,766, filed on Sep. 10, 1998.

(51) Int. Cl.[7] .............................. G08B 17/12; G01J 5/02
(52) U.S. Cl. .............................. 250/338.1; 250/339.15; 250/342
(58) Field of Search .................. 250/338.1, 339.03, 250/339.04, 339.09, 339.15, 339.14, 340, 341.5, 342; 374/124, 128, 133, 129

(56) References Cited

U.S. PATENT DOCUMENTS

| 4,101,767 A | 7/1978 | Lennington et al. |
| 4,471,221 A | 9/1984 | Middleton et al. |
| 4,494,881 A | 1/1985 | Everest |
| 4,626,686 A | 12/1986 | Pompei et al. |
| 4,634,294 A | 1/1987 | Christol et al. |
| 4,694,172 A | 9/1987 | Powell et al. |
| 4,784,149 A * | 11/1988 | Berman et al. .............. 374/129 |
| 5,352,039 A | 10/1994 | Barral et al. |
| 5,422,484 A | 6/1995 | Brogi et al. |
| 5,522,662 A * | 6/1996 | Shiokawa .................... 374/130 |
| 5,714,862 A | 2/1998 | Mikesell et al. |
| 5,726,632 A * | 3/1998 | Barnes et al. ................ 250/332 |
| 5,751,215 A | 5/1998 | Hall, Jr. |
| 5,929,450 A | 7/1999 | Glasheen et al. |
| 6,153,881 A | 11/2000 | Castleman |
| 6,255,650 B1 * | 7/2001 | Warner et al. ............... 250/330 |

FOREIGN PATENT DOCUMENTS

JP 04035309 A * 2/1992 ............ H03G/3/20

* cited by examiner

Primary Examiner—Albert Gagliardi
(74) Attorney, Agent, or Firm—Knobbe, Martens, Olson & Bear, LLP

(57) ABSTRACT

An elongated heat detection device identifies heat sources based upon infrared radiation. The device includes a purged and sealed instrumentation chamber and a rugged and shock absorbing case. The case surrounds and protects the chamber and includes anti-roll features. The instrumentation is provided in a forward end of the device and is capable of being plugged into the balance of the device for rapid repair and replacement. The power supply is contained in a rear end of the device and the case forms a portion of the power supply circuit. The device employs a startup test of the sensor and the power supply. Also, the power supply is continuously monitored. The device also employs a lost device locator such that the device can be readily located after being misplaced. Moreover, the device has a signal expanding feature that allows a heat source that is rapidly passed over to be relocated on subsequent sweeps of the device.

20 Claims, 23 Drawing Sheets

HANDHELD HEAT DETECTION DEVICE

RELATED APPLICATIONS

This application is a division of U.S. application Ser. No. 09/393,509, filed Sep. 10, 1999, which has issued as U.S. Pat. No. 6,388,254 on May 14, 2002, which was based upon and claimed the domestic priority benefit under 35 U.S.C. § 119(e) of U.S. Provisional Patent Application No. 60/099,766, filed on Sep. 10, 1998.

BACKGROUND OF THE INVENTION

1. Field of the Invention

The present invention generally relates to infrared sensing devices. More specifically, the present invention relates to handheld infrared sensing devices capable of detecting heat sources and hot spots, such as those commonly encountered in fire fighting.

2. Related Art

In the risky endeavor of fire fighting, identifying the actual source of smoke can be a challenge. As everyone is aware, the flames are at the source of the smoke. However, in cold environments, in windy environments, and in enclosed environments, identifying the fire source through smoke and mist can be a difficult endeavor.

Every heat source, including fire, emits infrared radiation. Such radiation readily travels through the fog, the rain, the smoke and the mist. Accordingly, by tracking the source of increased radiation, the location of a fire can be tracked. In addition, identification of an infrared radiation source may help prevent later flare-ups at those sources.

Accordingly, various infrared heat detection devices have been developed. These devices may be handheld or mounted to moving structures. The heat detection devices emit signals to indicate where a source of infrared radiation exists. The devices are commonly battery powered and use an infrared detector to sense the radiation. Most of these devices suffer from one or more drawbacks, however. For instance, the devices may not be rugged enough in design to withstand daily use in tough environments. The devices also may not be adequately sealed or shock-proofed. When damaged, some of the devices may not be easily repaired by simple replacement of damaged components. Thus, some of the devices may fail and require extensive downtime for repair. In extreme cases, the devices may require complete replacement.

In addition, some of the devices have limited capabilities under realistic fire fighting conditions. For instance, if some of the devices are rapidly swept over a portion of a scan field and a source of radiation is quickly passed over, the currently marketed devices may not indicate the presence of the radiation. The radiation may be indicative of a future flare up and, because the device could not maintain a signal long enough to emit a perceivable alert, the source of radiation may be overlooked. In such instances, the device must be swept more slowly to be certain such sources are not present.

Moreover, the ambient noise level in realistic fire fighting scenarios is high enough to mute an audible output signal. The size of any devices limits the sizing of the associated speaker and, therefore, the available amplification that can be handled by the speaker. Thus, the output from the speaker is necessarily limited.

SUMMARY OF THE INVENTION

Accordingly, a more rugged and reliable heat detector is desired. Preferably, the heat detector should protect the sensitive circuitry and power supply from both liquids (i.e., moisture) and shocks. For instance, if the detector is hit with water spray, the detector should shield the circuitry from moisture. If the detector is dropped, the detector should absorb a substantial portion of the impact to reduce the shock transferred to the power source and the circuitry. Also, the detector should lock and hold spike signals, or otherwise call such signals to the attention of the user so that small heat sources can more easily be detected and located. Moreover, the speaker should be capable of being amplified through speaker chamber design as well as electronic amplification.

Thus, one aspect of the invention involves an infrared radiation-detecting device comprising a hermetically sealed housing. The housing has a generally cylindrical shape with a proximal end and a distal end. A distally facing opening is formed in the distal end and a detector and circuitry arrangement is mounted within the distally facing opening. A power supply is mounted within the housing proximal of a substantial portion of the detector and circuitry arrangement. The detector and circuitry arrangement also includes a distally facing radiation detector. A circuit is capable of receiving a signal from the detector with the signal being reflective of a level of radiation being detected. The circuit controls an output from a speaker based upon the level of radiation being detected and controls an output from an optical indicator based upon the level of radiation being detected. The circuit is capable of extending a duration of the output so that the device continues to indicate the detection of a heat source even through the heat source is no longer detectable. This extended signal allows one to identify a heat source with a quicker sweep of an area using the device. The extended signal may differ from an order detection signal to indicate that the device is extending the signal artificially.

Another aspect of the present invention involves a method of detecting infrared radiation. The method includes supplying power to a heat-detecting device having an infrared detector assembly. The method also includes reading preset values from a memory location into a circuit and setting a gain for the infrared detector assembly based upon the preset values. This allows each device to be specially configured to the particular infrared detector assembly being used. The method further involves checking a power supply for the device, testing the infrared detector assembly and alerting a user to the operability of the infrared detector assembly. This self-test advantageously confirms that the device is operable before the device is put to use. Moreover, the method involves activating a timer and using the infrared detector assembly to at least intermittently sample radiation. The timer ensures that the device is not inadvertently left on. A signal is emitted that is indicative of a level of radiation sampled. This allows a user to determine the hottest locations in a fire or in a swept area. Another aspect of the method includes checking an ambient temperature of the infrared detector assembly. By checking the ambient temperature of the infrared detector assembly, the output signal advantageously may be adjusted to account for changes in sensor sensitivity caused by changes in ambient temperature.

A further aspect of the present invention involves a method of controlling a motor speed without the need for a tachometer. This method is useful in reducing components within a handheld heat detection device while allowing a chopping disk driving motor to maintain a constant speed. It is anticipated that this method may also have applications in a variety of other environments. The speed control method generally comprises setting an input voltage to the motor such that the motor may turn at a predetermined speed, applying the voltage to the motor and waiting a predetermined period of time such that the motor may approach the predetermined speed. The method also involves removing the voltage from the motor, measuring the output power from the motor, and calculating the rotational speed of the motor based upon the measured output power. The method also includes returning the voltage to the motor and adjusting the voltage applied to the motor to increase or decrease the speed of the motor.

BRIEF DESCRIPTION OF THE DRAWINGS

These and other features, aspects and advantages of the present invention will now be described with reference to the drawings of a preferred embodiment, which embodiment is intended to illustrate and not to limit the invention, and in which figures:

FIGS. 19A–19N, is a detailed circuit diagram of one implementation of the block diagrams in FIGS. 17 and 18;

FIGS. 23A–23D, is a detailed circuit diagram of a motor control circuit;

DETAILED DESCRIPTION OF THE PREFERRED EMBODIMENTS OF THE INVENTION

Figure 1:
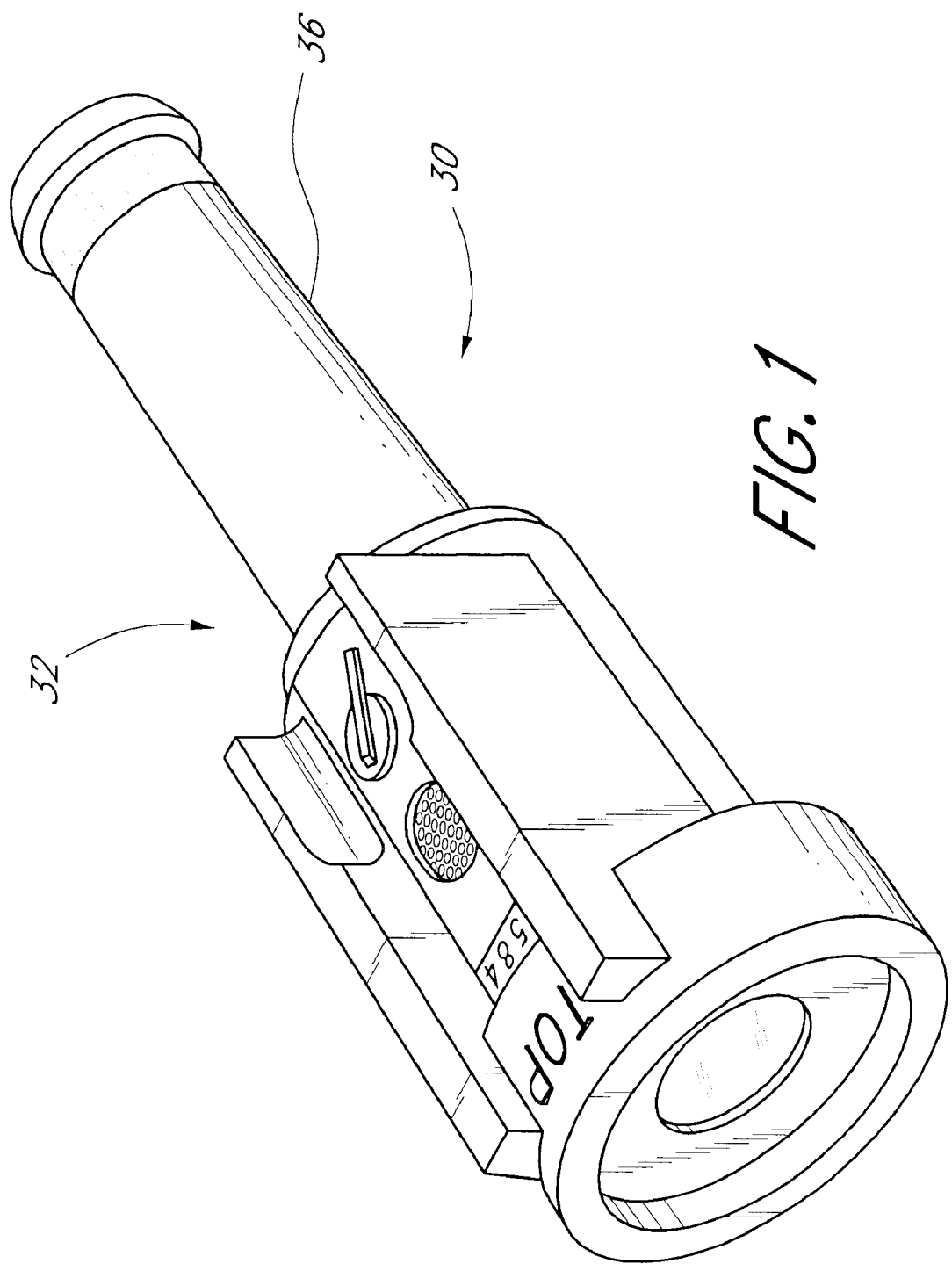
FIG. 1 is a perspective view of an exemplifying handheld infrared sensing device having features, aspects and advantages in accordance with the present invention.
Figure 2:
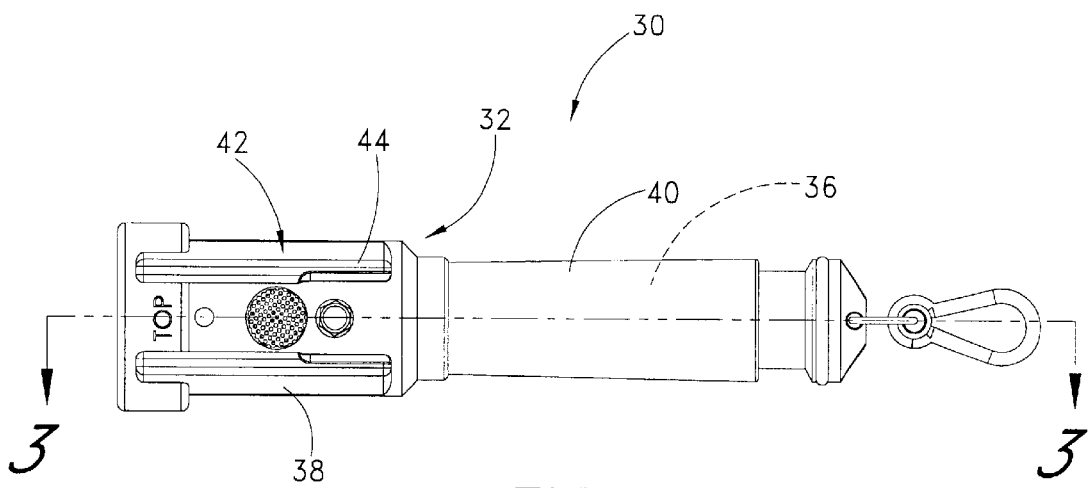
FIG. 2 is a top view of the heat sensor of FIG. 1.

With initial reference to FIGS. 1 and 2, an exemplifying infrared sensing device, indicated generally by the reference numeral 30, is illustrated therein. In general, the device 30 quickly and efficiently detects high temperature heat source using infrared radiation being emitted by the heat source, which allows a user to locate the heat source. The device 30 may also signal the intensity of infrared emissions from a heat source, thereby signaling an approximate temperature of the heat source. In one environment of use, the device 30 may be used by fire fighters as they search for hot spots through dense smoke, haze or direct sunlight. In other environments of use, the device 30 may detect the temperature of rail car wheels or identify high temperature embers following forest fires and the like. Of course, use of the present device 30 is not restricted to the above exemplifying environments of use and other applications will be readily apparent to those of ordinary skill in the art.

Figure 3:
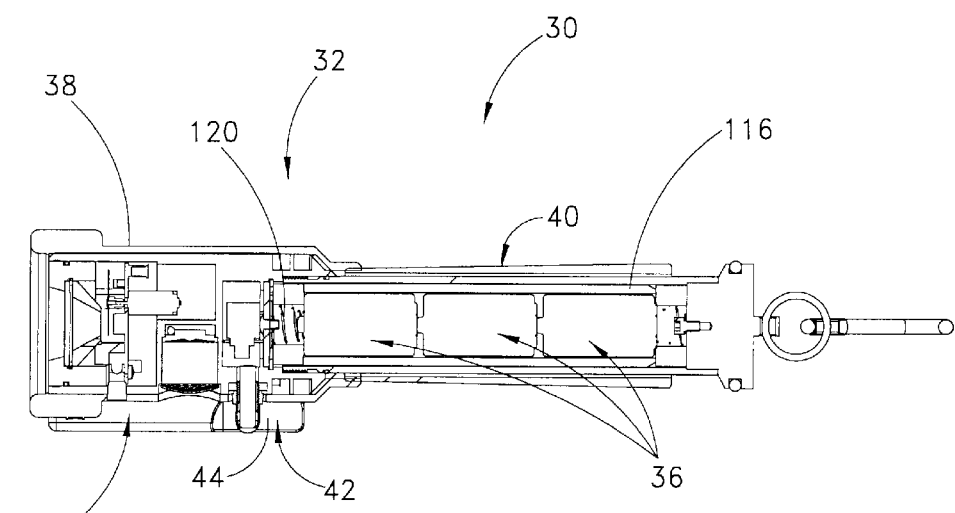
FIG. 3 is a sectioned view of the heat sensor of FIG. 1 taken through the line 3—3.

With reference now to FIGS. 1–3, the illustrated device 30 generally comprises a housing 32, a presently preferred detector and circuitry arrangement 34, and a power source 36. As illustrated, the housing 32 encases a substantial portion of the detector and circuitry arrangement 34 as well as the power source 36. Preferably, the housing 32 is hermetically sealed to encase the detector and circuitry arrangement 34 and more preferably, the housing 32 is hermetically sealed to encase both the detector and circuitry arrangement 34 and the power source 36. Beginning with the housing 32, each of the general components 32, 34, 36 will now be described in detail.

With reference to FIG. 2, the illustrated housing 32 generally is subdivided into a forward casing or head 38 and a handle 40. The housing 32 is desirably configured to inhibit rolling when the device 30 is out of the hand of an operator. Accordingly, the housing 32 preferably comprises a generally cylindrical configuration having some type of an upstanding boss portion 42. In the illustrated device 30, the forward casing 36 includes a pair of flanges 44 that minimize the rolling of the device 30. Such flanges 44 reduce the likelihood of a dropped device 30 rolling out of reach of an operator. While the boss portion 42 in the presently preferred device 30 comprises the flanges 44, other anti-roll configurations are also possible. For instance, the head 38 of the device 30 may have a hexagonal configuration, octagonal configuration, triangular configuration and a variety of other surfaces jutting from a cylindrical body. Moreover, at least the handle or another component of the housing may be formed in a non-cylindrical shape to reduce the possible rolling of the detector 30 when dropped or placed out of the reach of an operator.

Figure 4:
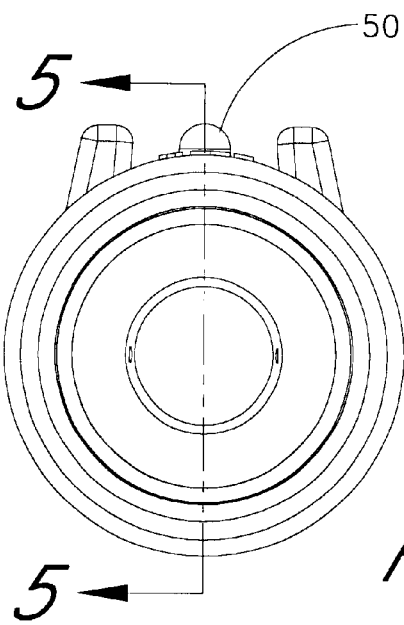
FIG. 4 is an end view of a head of the heat sensor of FIG. 1.

The forward casing or head 36, which preferably houses at least a substantial portion of the detector and circuitry arrangement 36, now will be described in detail. With reference to FIGS. 3 and 4, the illustrated forward casing 36 is preferably formed of a single sleeve-like member. In the illustrated embodiment, the forward casing 36 is manufactured from a single slug of aluminum. In other embodiments, the forward casing may be manufactured in multiple segments that are connected together. It has been found that the presently preferred single slug embodiment advantageously reduces manufacturing costs and increases the strength of the casing relative to segmented embodiments.

Figure 5:
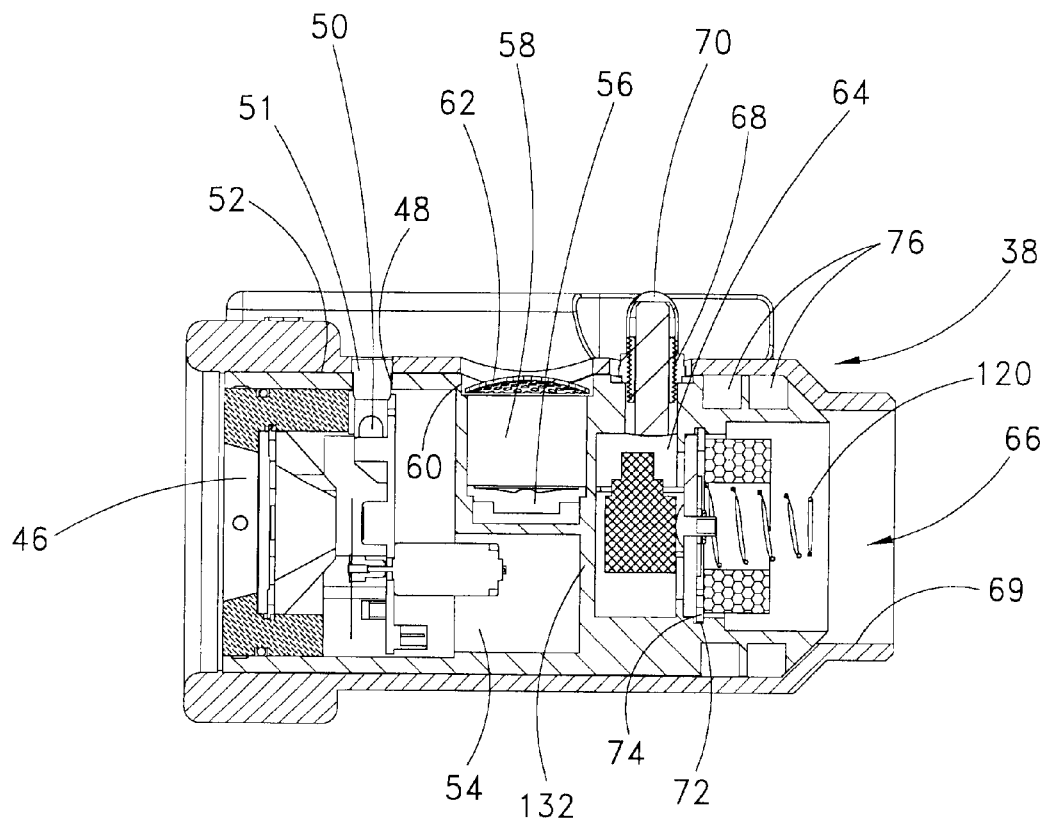
FIG. 5 is a sectioned view of the head of FIG. 4 taken through the line 5—5.

With reference now to FIG. 5, several chambers are formed within the illustrated casing 36. Each chamber is preferably at least substantially sealed from the other chambers. Preferably, the chambers are air and liquid proofed. More preferably, during manufacture, dry gas is used to purge the chambers prior to sealing and a desiccant is placed within the chamber to absorb a majority of any moisture remaining within the chambers. These construction techniques extend the life of the device 30 by reducing the effect of moisture on the sensitive circuitry.

One chamber, a sensor chamber 46, is formed in a forward portion of the casing 36. The sensor chamber 46 is preferably formed in a step configuration and sized to accept a detector and circuitry arrangement 34, which will be described in detail below. As illustrated, an enlarged forward portion of the chamber 46 includes a forward opening and a side aperture 48, which extends through a sidewall 52. The aperture 48 is preferably sized and configured to accept a light transmissive plug 51, which transfers light from a diode 50, as will be described in detail below. Accordingly, the aperture 48, and therefore the light transmissive plug 51, is preferably positioned for easy viewing while the sensor 30 is being used. For instance, in the illustrated sensor 30, the aperture 48 is positioned on an upper or top portion of the casing 36. The rearmost portion of the illustrated sensor chamber 46 has a smaller offset portion 54, which provides adequate clearance for a rearwardly protruding portion of the detector and circuitry arrangement 34.

With continued reference to FIG. 5, the casing also includes a speaker chamber 56. The speaker chamber 56 is preferably sized and configured to closely accommodate a speaker 58. Preferably, because the speaker chamber 56 is not sealed to the outside environment, the speaker 58 is liquid resistant or water proof. Because the speaker 58 is slip fit into position, the output of the speaker 58 is not greatly distorted. Also, this configuration allows the speaker to be easily replaced if damaged.

The illustrated speaker chamber 56 is cylindrical in shape with an axis of the chamber 56 extending in a direction generally transverse to an axis of the heat sensor 30. The presently preferred configuration results in a compact arrangement of compartments that may be completely or substantially sealed from one another. In addition, while other chamber configurations are possible, the cylindrical shape of the illustrated chamber 56 helps create a speaker box that has the properties of an infinite resonance chamber. As such, the illustrated chamber 56 actually functions to amplify the sounds emitted by the speaker 58 through strategic sizing of the chamber 56 and positioning of the sound source 58.

The speaker chamber 56 also includes a mounting arrangement for a speaker cover 62. In the illustrated device 30, a recessed lip groove 60, which circumscribes an upper portion of the chamber, is sized and configured to accept and retain the speaker cover 62. The presently preferred speaker cover 62 is formed of a stainless steel mesh or screen. The speaker cover 62 is advantageously domed prior to being pressed into position within the lip groove 60. Such a configuration eases assembly and, in some embodiments, facilitates a removable speaker cover arrangement, which allows the cover to be removed for servicing of the speaker 58. As will be recognized, the speaker cover 62 may also be permanently or semi-permanently held in position over the speaker chamber 56 by welding or gluing, for example.

With continued reference to FIG. 5, the casing 36 of the heat sensor 30 also includes a rear chamber 64. The rear chamber 64 of the illustrated casing 36 extends inward from a rearwardly facing portion of the casing 36. The illustrated rear chamber is preferably sized and configured to accommodate a switching assembly/battery board combination 66, which will be described below. In the presently preferred embodiment, the rear chamber 64 includes a side aperture 68 and a rearward facing opening 69. A portion of the switching assembly extends into the rear chamber 64 through the side aperture 68 in the illustrated device 30. Specifically, a bushing 69 is positioning in the said aperture 68, which is preferably threaded, and a floating shaft 70 extends through the bushing 69 to selectively contact a button on the illustrated switching assembly/battery board combination 66. As will be recognized by those of ordinary skill in the art, other operative connections may also be used to operate the switching assembly, including, but not limited to, levers, toggles, and the like.

The illustrated rear chamber 64 preferably also includes an internal circumferential groove 72 that is receptive of a snap ring 74, which will be discussed below. Moreover, the casing 36 is also provided with at least one, but preferably, more than one, external circumferential groove 76. The groove or grooves 76 remove material in strategic locations to reduce the weight of the casing 36 while not compromising the structural integrity of the heat sensor 30.

Figure 6:
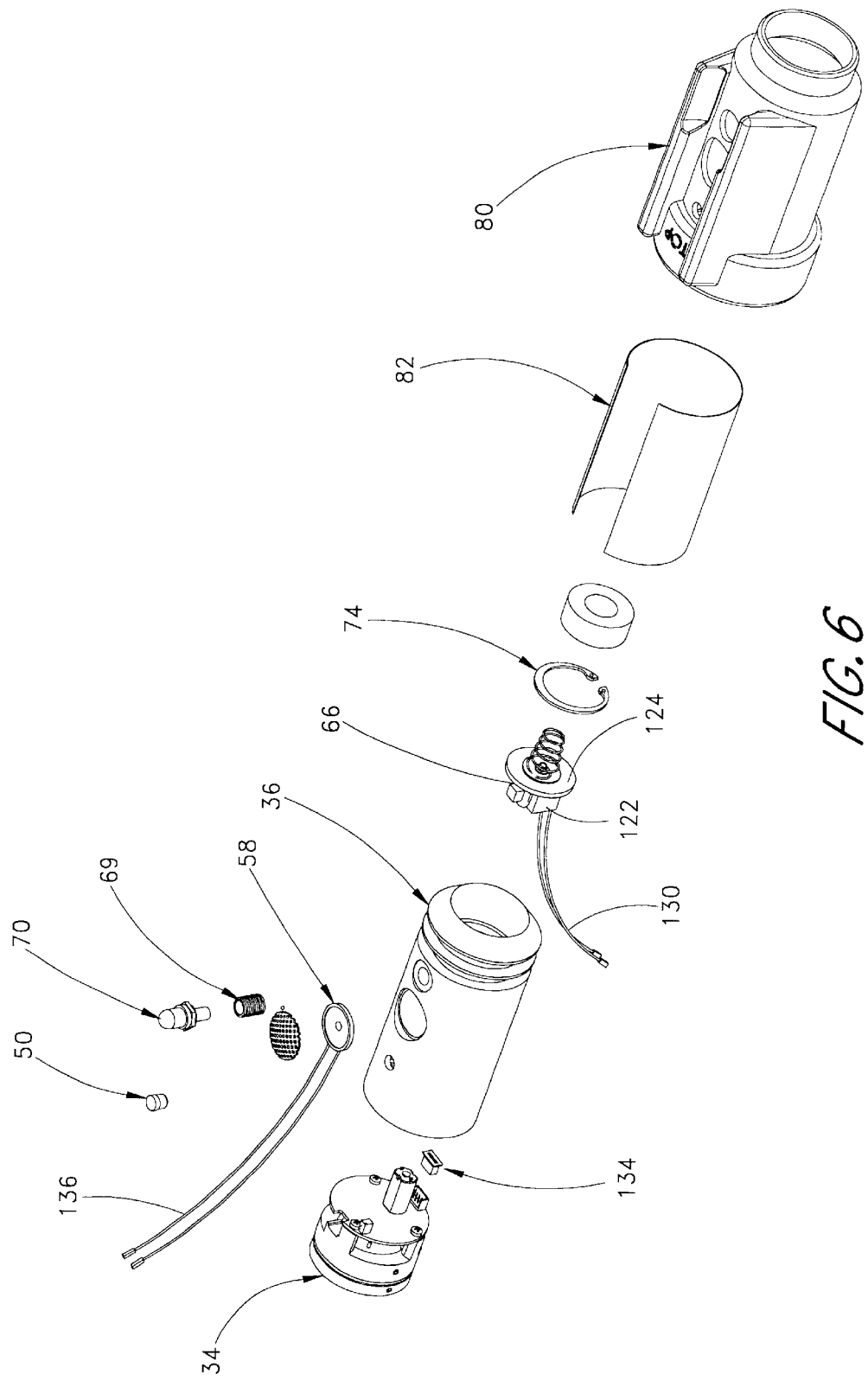
FIG. 6 is an exploded perspective view of the head of FIG. 4.

With reference now to FIG. 6, the casing 36 is substantially surrounded by a protective boot 80 in the illustrated embodiment. The illustrated boot has a distinctive enlarged forward portion. As illustrated, the boot 80 is substantially cylindrical in design and includes the anti-roll flanges 44 described above. It is anticipated that the flanges may be formed on the casing 36 or attached to the casing 36 and may extend through the protective boot in some embodiments. It is preferred, however, to form the anti-roll structure into the protective boot itself. The illustrated boot 80 helps reduce the shocks transferred to the components installed within the casing 36 and, therefore, the boot 80 is preferably manufactured from a shock absorbing material, such as, for instance, but without limitation, foam rubber, urethane, or molded rubber. Preferably, the boot 80 has an increased thickness proximate some sensitive components (i.e., the region of the detector and circuitry arrangement 34). It is presently preferred to manufacture the boot 80 from molded rubber having a high tear strength and resiliency. As also illustrated in FIG. 1, the boot 80 provides an ideal location to emblazon a logo, other identifying indicia or instructions on the device 30 itself. Also, because the illustrated boot extends over a control switch, the switch is protected in the event of a dropped device 30.

With continued reference to FIG. 6, the boot 80 is secured to the casing 36 through the use of double sided tape 82 in the illustrated embodiment. While other techniques and materials, such as adhesive spray or direct adhesion or cohesion of materials may be used to connect a protective boot to the casing, the use of double sided tape 82 has been found to advantageously reduce manufacturing costs and material costs.

With reference now to FIGS. 10–13, the housing 32 also includes the handle 40. The handle 40 generally comprises a cylindrical shell 84 in the illustrated embodiment. A forward end of the shell 84 is externally threaded 86 to fasten the illustrated handle 40 to the illustrated head 38. An O-ring is preferably positioned within an O-ring groove on the handle 40 to increase the liquid-resistance of the housing 32. Of course the handle 40 and the head 38 may be attached together in any suitable manner; however, it is presently preferred to removably secure the head 38 to the handle 40 such that easy access to the power source 36, which is preferably contained within the handle 40, may be maintained. Additionally, the illustrated design positions a substantial portion of the circuitry within the head 38 and generally positions the power source within the handle 40. While the illustrated handle 40 is shown to be cylindrical, it is envisioned that the geometry of the handle may be varied; however, it is preferred that the handle have an easily grasped configuration. In some applications, the handle 40 will be held by a heavily gloved hand of a fire fighter or the like and, therefore, a simple cylindrical configuration is presently preferred.

Figure 12:
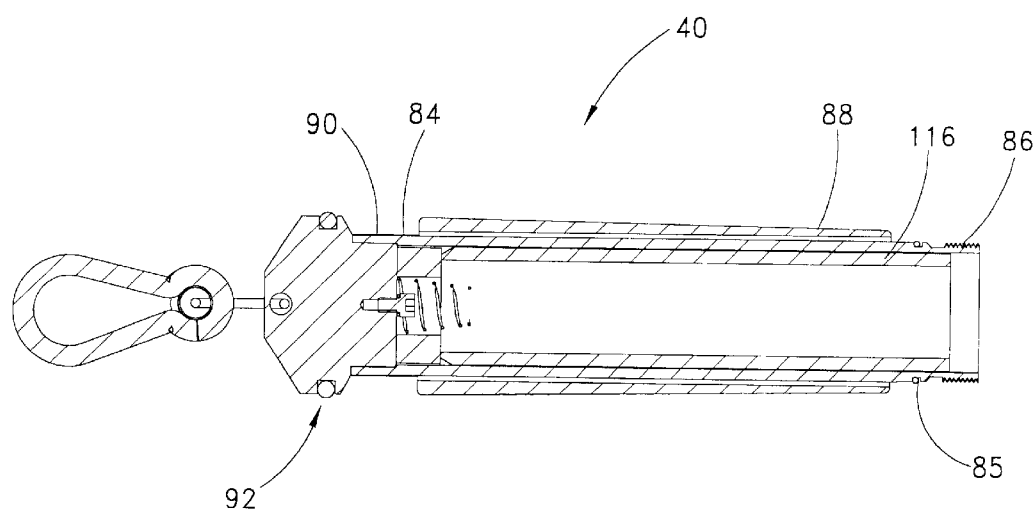
FIG. 12 is a sectioned view of the handle assembly of FIG. 11 taken through the line 12—12.

With reference to FIG. 12, the shell 84 preferably carries a gripping portion 88. The gripping portion 88 may be made from any suitable material. In the illustrated embodiment, the gripping portion 88 is a soft rubber compound. In some embodiments, the gripping portion 88 may be a tackified resin or tape. As will be recognized by those of ordinary skill in the art, the gripping portion 88 may be adhered or cohered to the handle 40 in any suitable manner. For instance, a double-sided tape or adhesive may be positioned between the shell 84 and the gripping portion 88.

Figure 13:
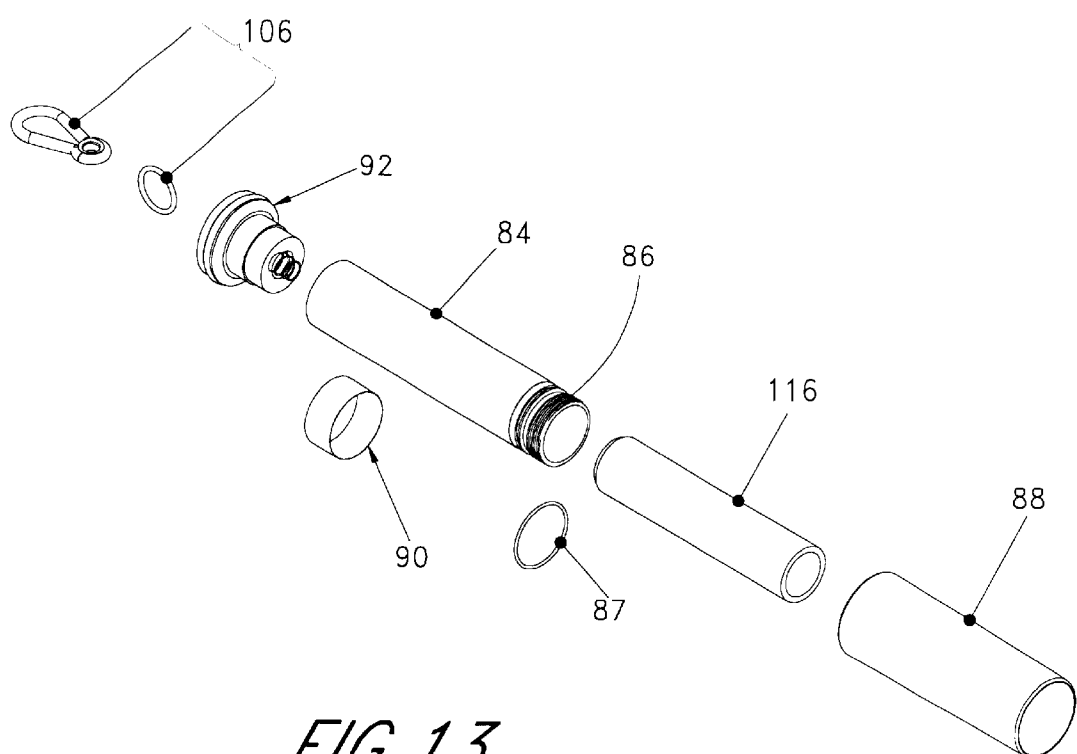
FIG. 13 is an exploded perspective view of the handle assembly of FIG. 11.
Figure 14:
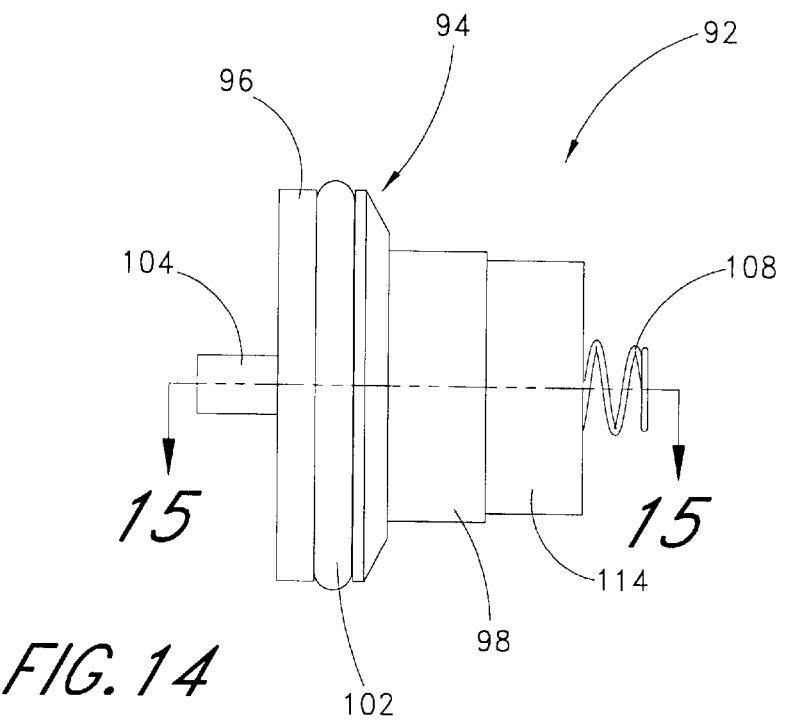
FIG. 14 is a top view of an end plug assembly of the handle assembly of FIG. 11.
Figure 15:
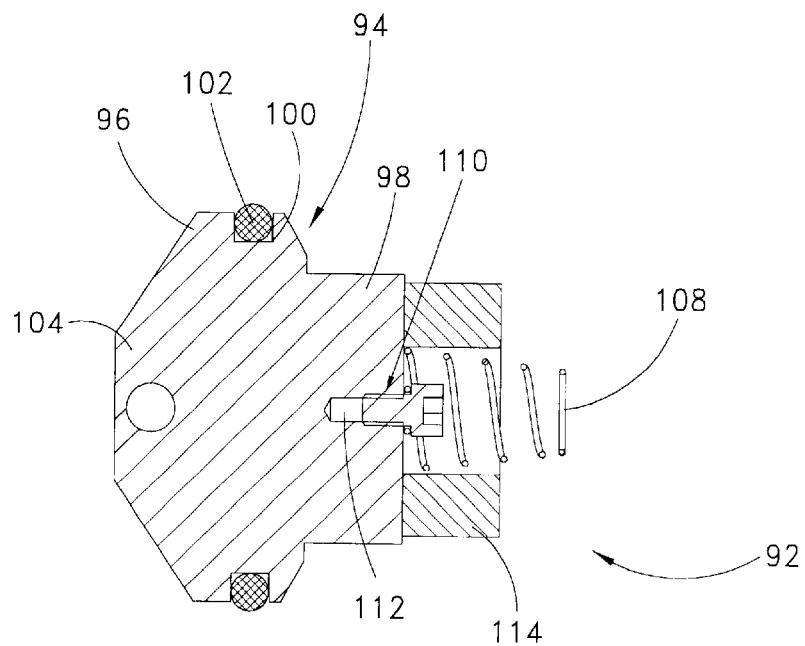
FIG. 15 is a sectioned view of the end plug assembly of FIG. 14 taken through the line 15—15.
Figure 16:
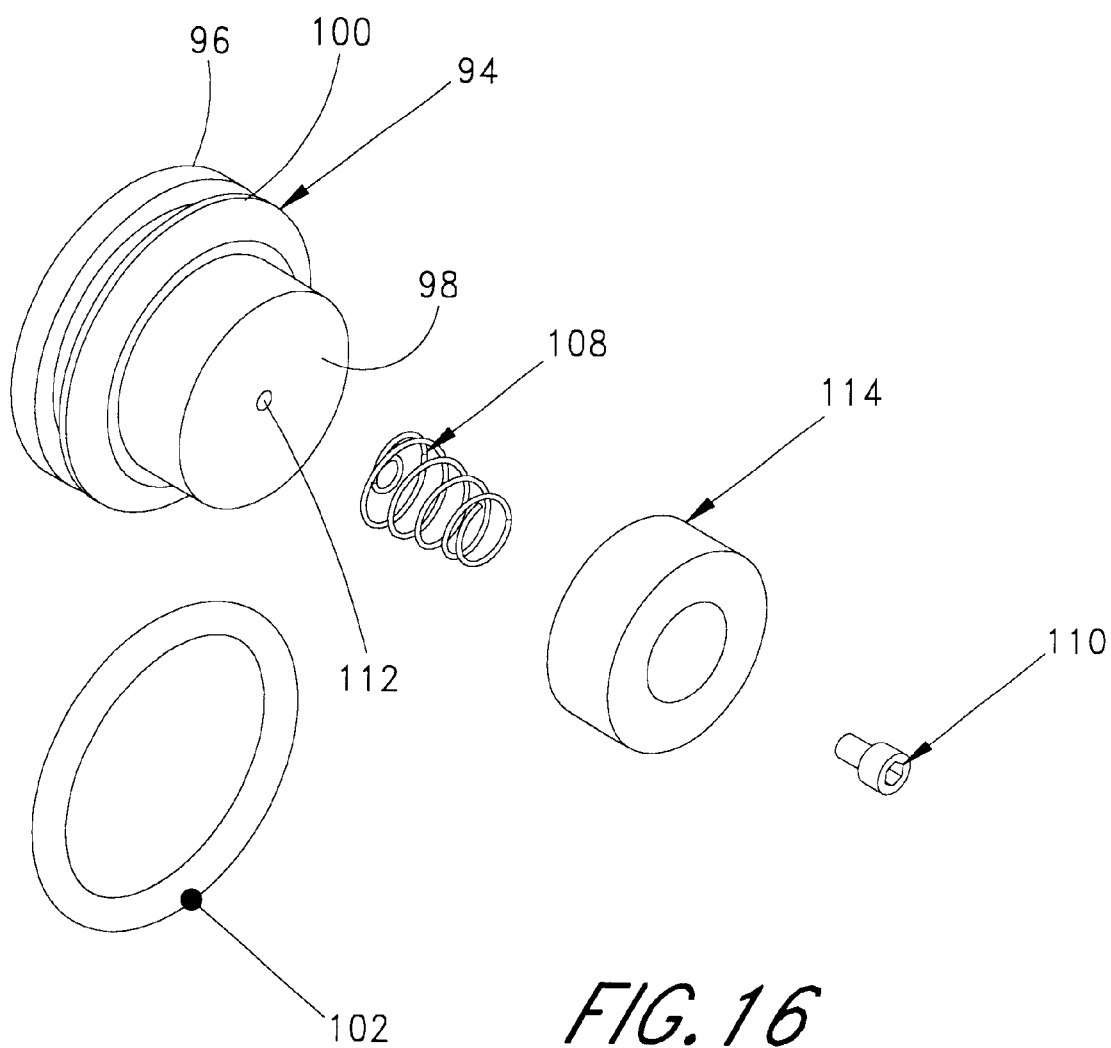
FIG. 16 is an exploded perspective view of the end plug assembly of FIG. 14.

With reference now to FIGS. 12 and 13, the shell 84 also carries a strip of reflective material 90 in the illustrated embodiment. Preferably, the reflective material 90 is adhered to the shell 84 at a position distal of the gripping portion 88 from the head 38. In this manner, the reflector 90 is positioned at the end of the heat sensor 30, which positioning allows the reflector 90 to be used to attract attention more easily than if the reflector 90 were located at a more intermediate position. However, it is recognized that the reflector may also be positioned at any intermediate position. Moreover, it is appreciated that the gripping material 88 may be formed with a reflective compound such that the gripping portion 88 forms a reflector.

With reference now to FIGS. 13–16, the shell terminates at a distal end, which is opposite the head 38, at an end cap assembly 92. The end cap assembly 92 substantially closes the distal end of the shell 84 and preferably forms a watertight and airtight chamber within the shell 84. In the illustrated device 30, the end cap assembly 92 features an end cap slug 94. The slug 94 may be manufactured of any suitable material including for instance, but without limitation, aluminum, titanium, plastic or other corrosion resistant materials. It is envisioned however, that some less corrosion resistant materials may also be used in some applications.

The illustrated slug 94 features a stepped configuration having a larger distal portion 96 and a smaller diameter proximal portion 98. The narrower proximal portion is preferably sized for interference fitting to the shell 88. The end cap slug 94 may also be joined to the shell 84 in any other suitable manner, including, without limitation, threading, welding, soldering, keying or using mechanical fasteners. The enlarged diameter portion 96 of the end cap slug 94 also includes an external circumferential groove 100. The groove 100 advantageously provides a mounting channel for an O-ring 102 in the illustrated embodiment. The O-ring serves to reduce the shock delivered to the handle 40 when the heat sensor 30 falls from an elevated position. The O-ring also provides a resilient surface upon which the heat sensor 30 may rest when not in use.

The end cap slug 94 also features a mounting boss 104. The mounting boss 104 provides a location for attachment of turnout gear clips or other suitable hooks and/or brackets. In the illustrated embodiment, a clip is provided, namely a carabeener, which is used to attach the device 30 to turnout gear on fire fighter uniforms, for example. Other clips, hooks, or fasteners may also be used to hang or store the device 30 in any suitable manner.

With reference again to FIG. 16, the end cap assembly 92 also comprises an electrical contact spring 108. As illustrated, the spring 108 may be attached to the end cap assembly 92 through the use of a threaded fastener 110. The spring 108 may also be integrally formed, attached, or secured to the end cap assembly 92 in any other suitable manner. The spring 108 forms one of two electrical contact points used for drawing electrical energy from the power source 36. In the illustrated embodiment, the threaded fastener 110 is sealed into a threaded opening 112. The spring 108, the slug 94 and the shell 84 together advantageously form an electrical connection to one end of the power source 36, as will be described below. Such a configuration simplifies the electrical wiring of the device 30 and results in a cleaner, more streamlined and more reliable device.

With continued reference to FIGS. 13–16, the end cap assembly 92 also features a resilient ring 114. The ring 114 advantageously absorbs shocks and ensures a firm connection between the power source 36 and the end cap assembly 92. The shock proofing results in a well-protected power source 36. The presently preferred ring 114 is formed of a foamed polyurethane; however, it is anticipated that any of a number of resilient materials may be used as the battery bumper or ring 114.

Figure 10:
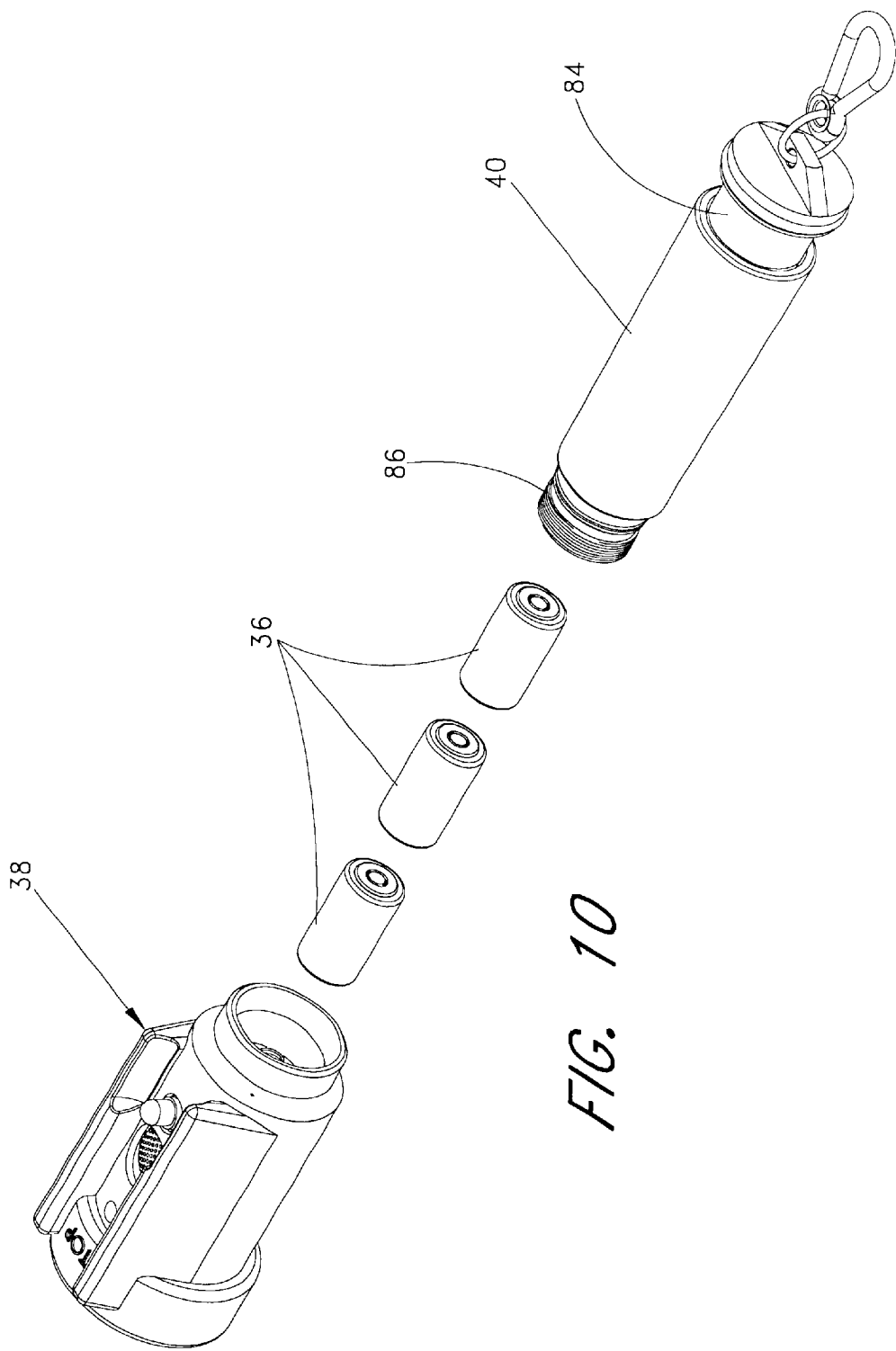
FIG. 10 is an exploded perspective view of the heat sensor of FIG. 1.
Figure 11:
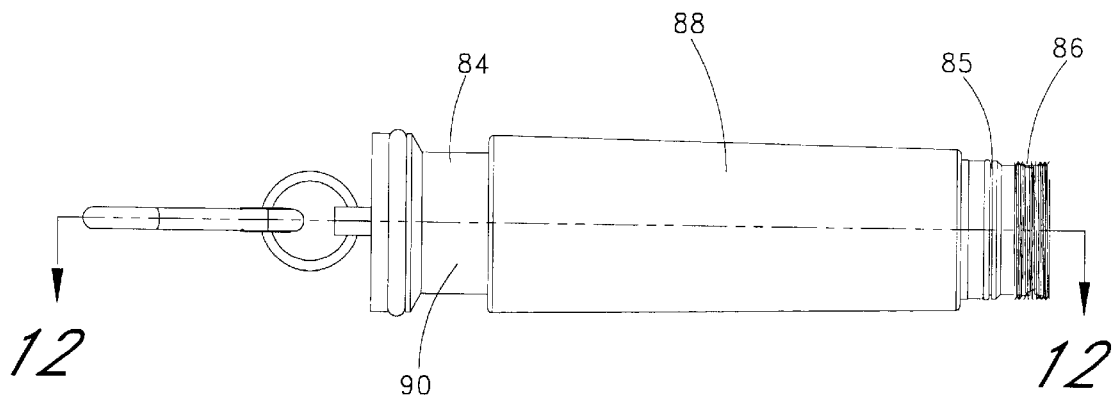
FIG. 11 is top view of a handle assembly of the heat sensor of FIG. 1.

With reference now to FIGS. 3, 10 and 13, the power source 36 is also somewhat protected within the illustrated shell 88 through the use of a PVC sleeve 116. In the illustrated embodiment, the shell 88 is sized and configured to receive three D-cell batteries. However, through the use of the sleeve 116, which is positioned within the shell 88, the device 30 may be powered alternatively by three C-cell batteries. Moreover, the sleeve 116 is advantageously formed from a resilient material, which can reduce the rattling and shock transferred from the shell 88 to the power sources 36. The sleeve 116 may slip fit into the shell 84 and, therefore, may be easily removed from position within the shell 84.

With reference again to FIG. 3, the proximal end of the power source 36 is in contact with a second contact spring 120. With reference to FIG. 5, the contact spring 120 forms a portion of the switching assembly/battery board combination 66. With the batteries positioned within the shell 84 and the shell 84 tightened into the casing 36 through the threaded connection, the power source circuit is complete. More specifically, the switch assembly/battery board 66 comprises a switch 122 and a printed circuit board 124, which are in electrical communication. The switch 122 may be any suitable switch and is preferably of the push button type. The switch 125 may also be a toggle type, a momentary type or any other suitable type.

The printed circuit board 124 contains a trace about its circumference that contacts an inner lip 126 of the casing 36 or the handle 40 in the illustrated device such that an electrical connection is established. The electrical connection between the printed circuit board 124 and the lip 126 is enhanced through the use of conductive grease. The retaining snap ring 74 holds the printed circuit board 124 in contact with the casing 36 in the illustrated embodiment. Specifically, the snap ring 74 holds the printed circuit board 124 in electrical contact with the casing lip 126.

In the illustrated arrangement, the positive terminal of the power source 36 contacts the proximal spring 120 while the negative terminal of the power source 36 contacts the distal spring 108. Because the distal spring 108 is in contact with the shell 84 and because the shell 84 is in contact with the casing 36 through the threads 86, a conductive channel is provided from the negative terminal to the trace on the printed circuit board 124. Thus, the trace of the circuit board 124 and the spring 120 respectively provide the positive and negative terminals. The switch 122 receives power from the circuit board 124 and, as showing in FIG. 6, a pair of leads 130 extend from the switch 122 for connection to the detector and circuitry arrangement 34, which will be described in detail below.

The casing 38 further comprises a baffle wall 132 that is interposed between the rear chamber 64 and the sensor chamber 46. A small hole may be provided within the baffle wall 132 such that the leads 130 may extend from the rear chamber 64 into the sensor chamber 46. This hole is then sealed with the leads 130 in place such that the two chambers are again substantially separated from one another to eliminate the possibility of water or air migration from one chamber to another.

As illustrated in FIG. 6, the leads 130 preferably terminate at a 4-mm female connector 134. This connector 134 is used to connect the leads 130 to the detector and circuitry arrangement 34. Moreover, this connector 134 is also used to connect a pair of leads 136 that extend through a small hole in the speaker chamber 56 from the speaker 58 to the detector and circuitry arrangement 34 which will now be described in detail.

Figure 7:
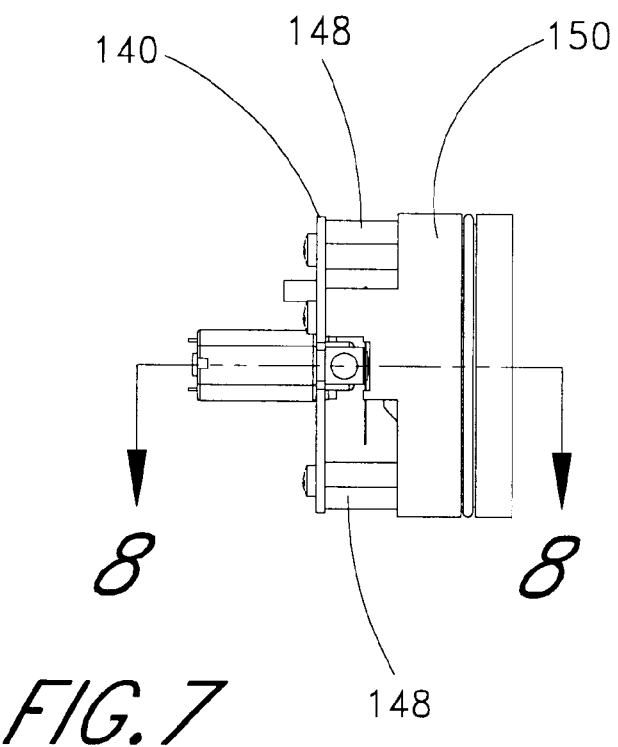
FIG. 7 is a top view of the detector and circuitry arrangement of the head of FIG. 4.
Figure 8:
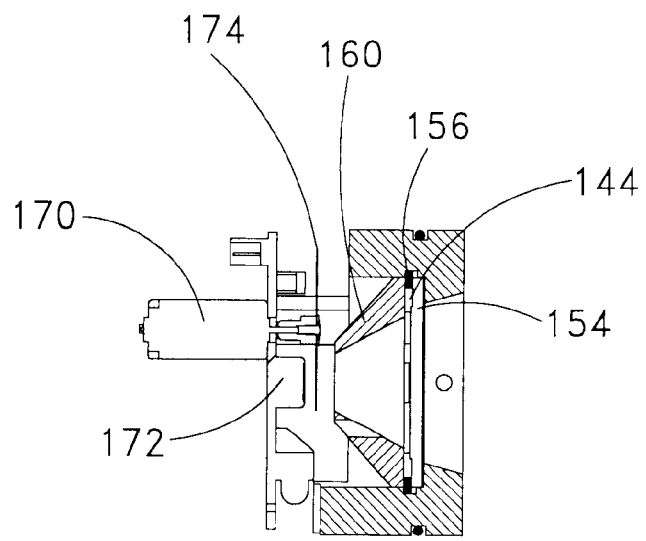
FIG. 8 is a sectioned view of the detector and circuitry arrangement of FIG. 7 taken through the line 8—8.
Figure 9:
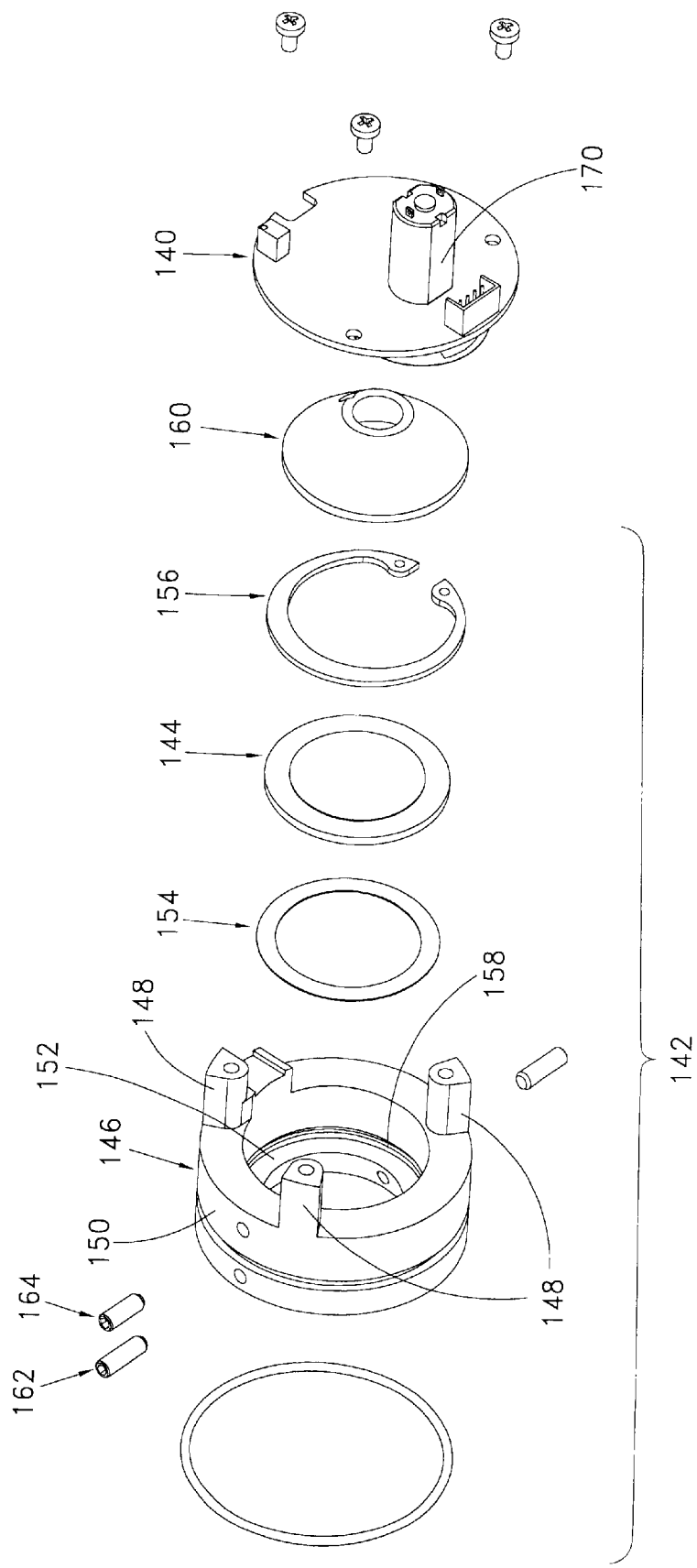
FIG. 9 is an exploded perspective view of the detector and circuitry arrangement of FIG. 7.

With reference now to FIGS. 7–9, a presently preferred detector and circuitry arrangement is illustrated therein. Preferably, a substantial portion of the circuitry and wiring is contained on the detector and circuitry arrangement. More preferably, all of the circuitry and wiring is contained on the detector and circuitry arrangement, other than the speaker, the power supply and the on-off switch. Such a construction allows easy replacement of the detector and circuitry in the event of a malfunction. For instance, the malfunctioning assembly may be unplugged and removed and a new assembly may be simply plugged into the speaker, the power supply and the on-off switch. Specifically, leads from the speaker and power supply (including the on-off switch) terminate in a first connector portion and the detector and circuitry arrangement includes a mating second connector portion. Thus, the two connectors may be plugged together for use and unplugged for repair and replacement.

In general, as illustrated in FIG. 9, the detector and circuitry arrangement 34 comprises at least one printed circuit board 140, a lens holding assembly 142, a lens 144 and a retaining ring 145. As illustrated, the printed circuit board 140 forms a base for the assembly while the lens mounting assembly 142 provides a structural framework for the assembly 34.

With continued reference to FIG. 9, a lens mounting assembly 142 features a precision engineered lens holder 146. The lens holder 146 generally comprises three triangulated legs 148 and a lens holding platform 150. The legs 148 are triangulated for placement on and around the printed circuit board 140 as illustrated best in FIG. 7. While three legs are illustrated, more than three legs may also be used. However, the use of three legs provides a stable mounting arrangement while reducing manufacturing costs. Additionally, as will be recognized, the use of three legs improves the accuracy with which the lens 144 may be mounted to the printed circuit board(s) 140.

With continued reference to FIG. 9, the lens 144, which is preferably a fresnel lens, is positioned against an inner lip 152 of the lens mounting platform 150. The lens is secured against a lens-mounting gasket 154 in manner that will be described. The gasket preferably absorbs shocks and reduces vibrations possibly transmitted between the lens 144 and the platform 150. Moreover, the gasket 154 provides a seal between the lens 144 and a forward end of the platform 150. Accordingly, the presently preferred gasket is manufactured from a soft resilient material.

As illustrated in FIG. 9, the lens 144 is held in place using a snap ring 156. The snap ring is secured within a circumferential groove 158. The groove is spaced apart from the lip 152 an adequate distance to securely hold the lens 144 in position. This lens-mounting configuration is best-illustrated in FIG. 8.

With reference now to FIG. 9, a focusing cone or lens housing shield 160 may be positioned between the printed circuit board(s) 140 and the lens 144. The shield 160 focuses the infrared rays being detected into a central region of the illustrated heat sensor 30. In some devices 30, as discussed below, the cone 160 may be omitted. The cone may be attached in any suitable manner. For instance, the cone may be secured in position using setscrews 162, 164. The setscrews 162, 164 may also be used to secure the lens, gasket, snap ring and cone in position as a unit.

With reference to FIG. 9, the printed circuit board 140 provides an additional platform upon several components may be mounted. For instance, in the illustrated embodiment, the circuit board 140 supports a motor 170, a detector 172, a microprocessor or CPU 202 and at least one light emitting diode 176. Each of these components, and the functions of each, will be discussed in more detail below. The printed circuit board 140 is manufactured in any suitable manner. In one embodiment, the circuit board 140 comprises a single four-layer circuit board designed to control various aspects of the heat sensors operation. In another embodiment, at least two circuit boards are joined together with a bus connection.

Figure 8A:
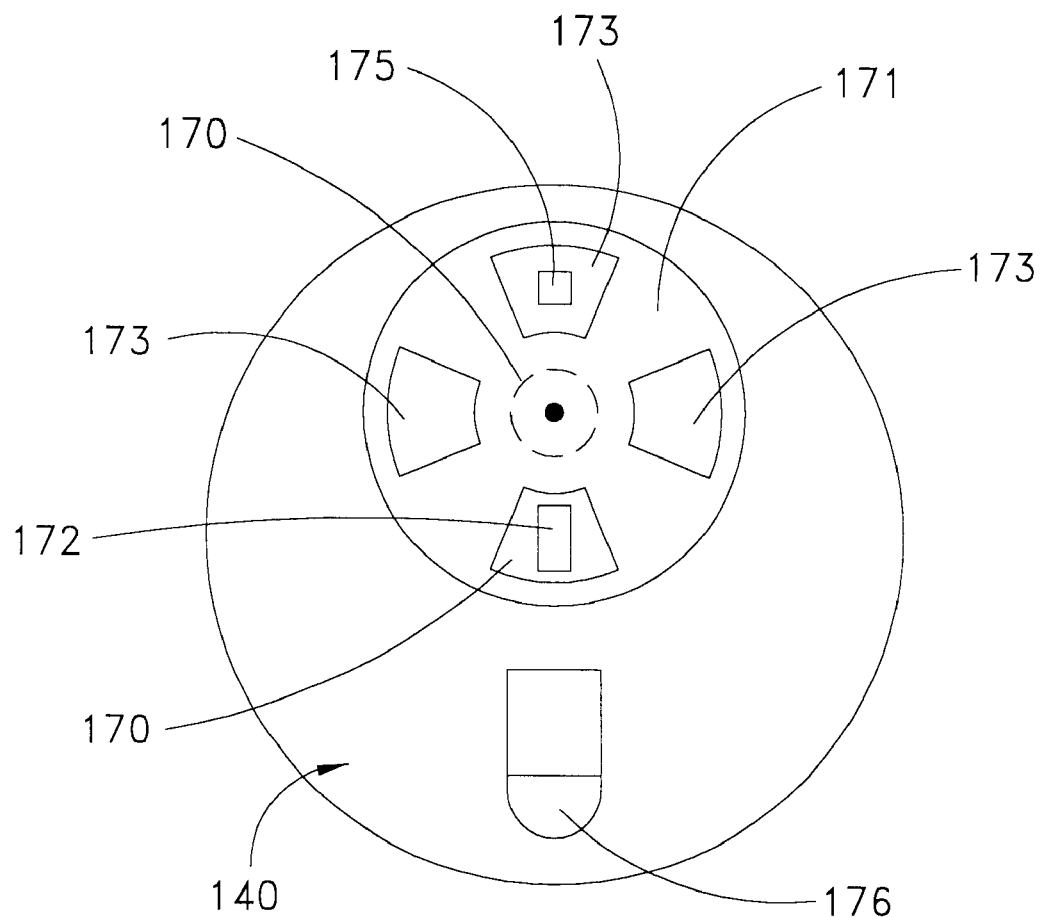
FIG. 8A is a sectioned view of the detector and circuitry arrangement of FIG. 8 taken through the line 8A—8A.

With reference now to FIG. 8A, the motor 170, which is carried by the circuit board 140, drives a chopping disk 171. The chopping disk 171 is a thin metal foil disk in the illustrated embodiment. The disk 171 contains at least one aperture or opening 173. In the illustrated device 30, the disk 171 has four generally equally sized and shaped apertures 173. It is anticipated that slots, holes, or other interruptions on the surface of the disk (i.e., reflectors) selectively direct radiation received through the lens 144 to the detector 172. In the illustrated device 30, the detector 172 is positioned along a central longitudinal axis of the device 30. Moreover, the detector 172 is preferably sized to received radiation along a substantially vertical plane when in use. Specifically, the presently preferred detector 172 measures approximately 0.5 mm by about 5 mm and is centered to the axis of the lens 144. Such a configuration renders a field of view of approximately 12 degrees vertically and 6 degrees horizontally. The field of view preferably ranges from between about 5 and 50 degrees in either field of view in other embodiments. In other embodiments, the field of view may be altered by a user through the use of a knob or some other control on the handheld device. The larger the field of view, the easier to identify a flare up but the smaller the field of view, the easier to pinpoint the source of the flare up. Accordingly, it has been found advantageous to reduce the field of view in some applications.

With continued reference to FIG. 8A, some devices 30 may also use an emitter and detector pair 175 that are positioned to either side of the disk 171. The pair 175 is used to monitor the speed of the disk 171, and therefore the speed of the motor output shaft, as will be described below.

The light emitting diode 176 is used to indicate whether a heat source is being detected. In one embodiment, the device 30 emits an audible tone through the speaker 58 that comprises short pulses of sound which increase in timing with increases in signal strength. Other audible signal characteristics, such as volume and pitch, may additionally or alternatively be used to indicate detection signal strength. Similarly, the light emitting diode 176 may also be used to pulse with increasing rapidity as a heat signal increases. Specifically, preferably, the LED blinks in proportion to the signal strength and the volume of the audible tone. In some device 30, at least two light emitting diodes 176 may be used. In such devices, one LED may indicate that no signal is being detected (i.e., a green diode) while another LED may indicate that a signal is being detected (i.e., a red diode). Also, for devices 30 having a variable gain (i.e., high sensitivity and low sensitivity) as will be discussed below, the differing LEDs may indicate which sensitivity has been selected or is currently in use (i.e., red is high sensitivity and green is low sensitivity). It is also anticipated that a calibrated read out that indicates temperature, either true temperature or a sliding relative scale, may be used. Such a calibrated read out may take the form of a digital read out (i.e., numbers) or may be a sliding bar graph type, for instance, but without limitation. Also, the light emitting diode 176 or other visual output may be positioned in closer proximity to the exterior of the device 30 rather than relying upon a light pipe to transfer the light emission to the exterior of the device 30. As will be appreciated, more than one light emitting diode 176 may operate with a single light pipe glass plug to allow the single plug to emit the light discharged by the light emitting diodes.

Figure 17:
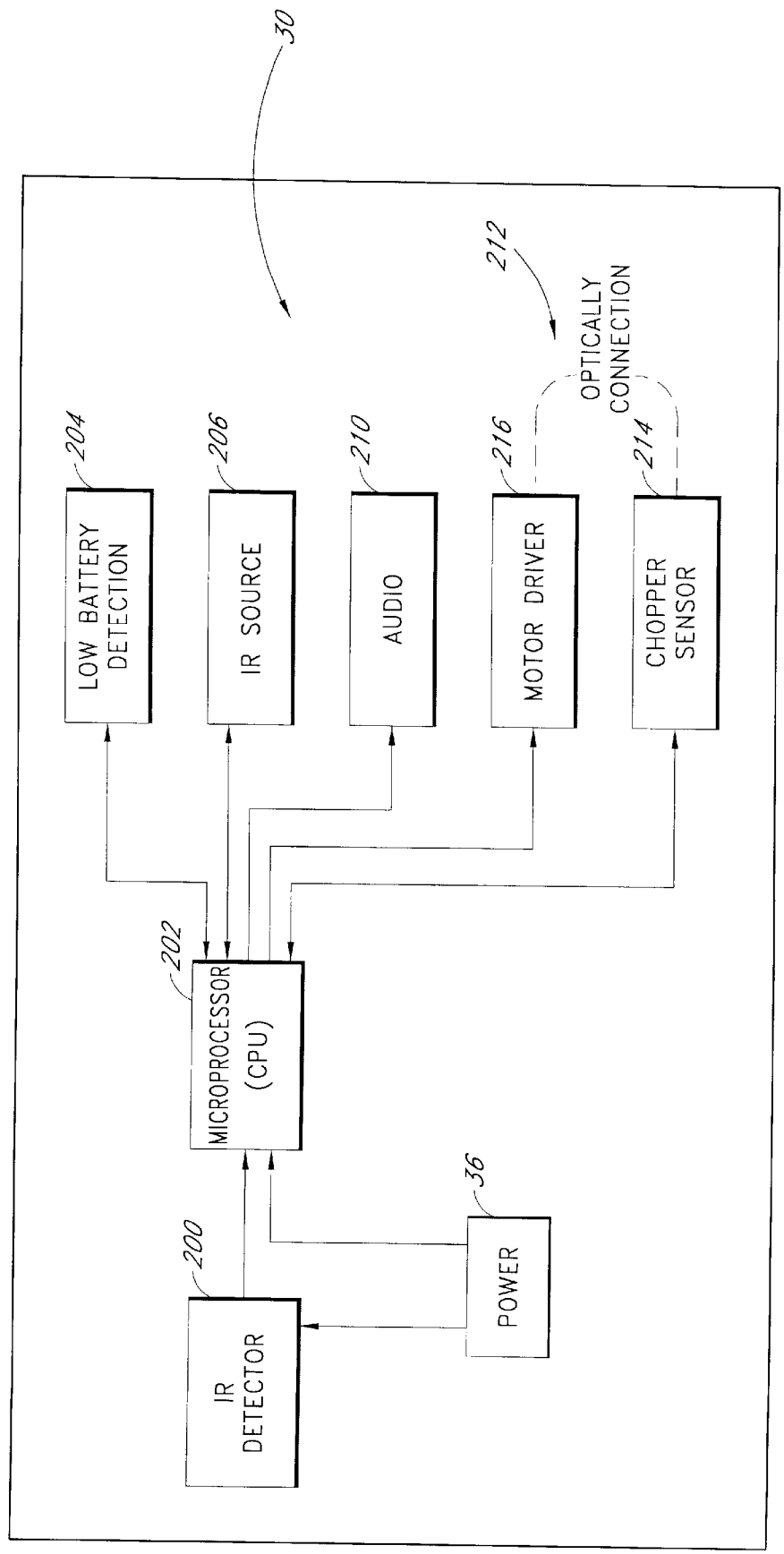
FIG. 17 is a schematic block diagram of an electrical layout of a heat sensor.

With reference now to FIG. 17, a schematic illustration of a presently preferred electrical configuration will be introduced and described. As illustrated, the device 30 comprises an infrared detector component 200. The detector component 200 samples incoming infrared radiation and outputs a signal to a microprocessor or CPU 202 that is indicative of a level of radiation being sensed. The level of incoming radiation sensed by the detector component 200 generally corresponds to a temperature of an area. A high level of incoming radiation is generally indicative of an increase in temperature, such as would be associated with a fire source or hot spot. Correspondingly, a decreasing level of incoming radiation is generally indicative of a decrease in temperature, such as would be associated with a cooled area, such as a wall.

With continued reference to FIG. 17, the CPU 202 communicates with a number of other components in manners which will be described in detail below. For instance, the CPU 202 communicates with a low battery detection circuit 204. The low battery detection circuit 204 is an intermediary between the CPU 202 and the power source 36 that outputs a value to the CPU 202 indicative the level of charge remaining in the power supply 36 or the time left before the power supply 36 requires recharging. The low battery detection circuit may also indicate when the level of the available power supply 36 has decreased below a predetermined level.

The CPU also communicates with an IR source 206. The IR source 206, as will be described, is used to test the device 30 upon start-up. If the IR source 206 is outputting an IR signal and the device is not detecting the signal, then a malfunction of the device 30 is indicated. The IR source 206 may be a light bulb in some embodiments and may be a heat generating electrical component, such as a resistor, in other embodiments.

In addition, the CPU 202 communicates with an audio generator 210. The present audio generator 210 emits an audio signal based upon the level of radiation being detected by the detector component 200. As will be described, the audio signal may vary in pitch, volume or tempo to reflect changes in signal intensity. A signal light, or the light emitting diode 176, may also form a portion of the audio generator 210 or be in communication with the audio generator 210, as described above.

The CPU also communicates with a motor control circuit 212. The motor 170 drives the signal chopping disk 171 to break the incoming radiation into samples that are separated by a baseline level of radiation. As described above, the presently preferred signal chopping disk 171 includes four apertures 173 that selectively allow radiation to strike the radiation detector 172 of the device 30. Accordingly, the chopping disk 171 is preferably rotated at a substantially constant rotational speed to maintain consistency between samples. In one implementation, a tachometer is used to sense the motor speed. The tachometer comprises the chopper sensor 214, which incorporates an emitter and a detector pairing 175 that are positioned to either side of the chopping disk 171. The chopper sensor 214 outputs a signal to the CPU 202 that is indicative of the rotational speed of the chopping disk 171 and, therefore, the rotational speed of the motor 170. The motor 170 is then controlled by the CPU 202 and the motor driver circuit 216 through pulse width modulation such that a substantially constant motor speed is maintained.

Figure 18:
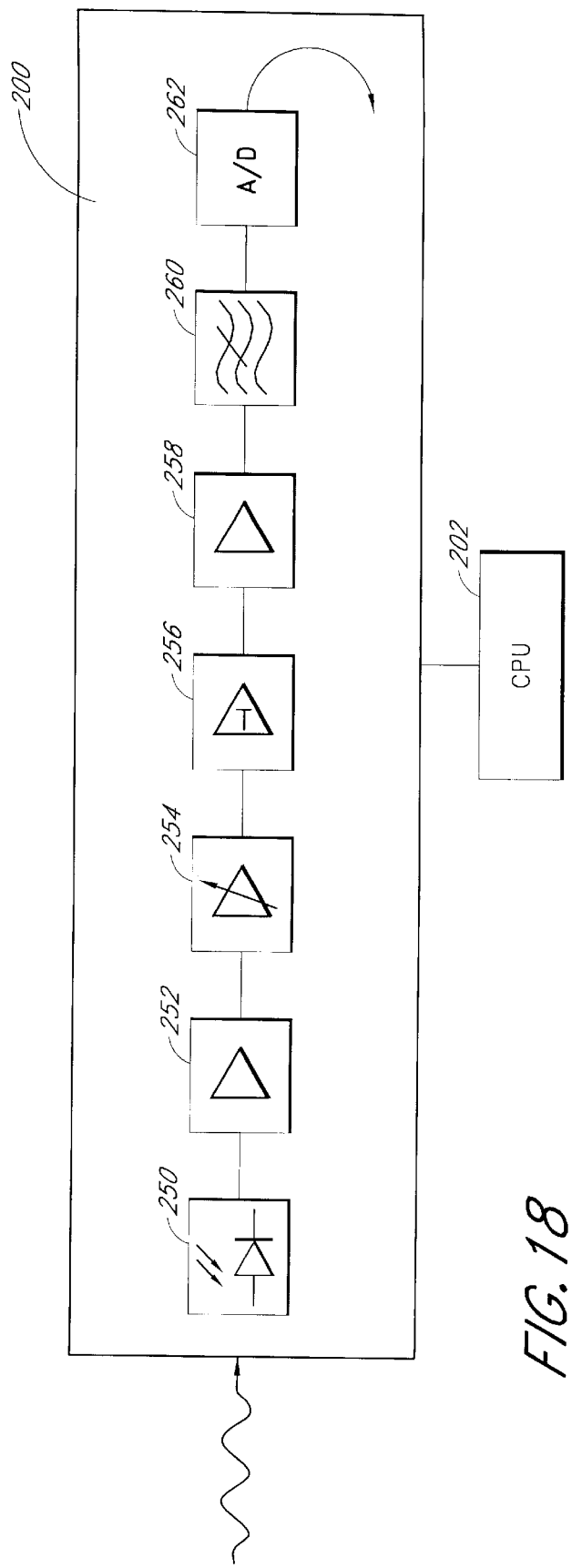
FIG. 18 is a more detailed block diagram of an infrared detector employed in the electrical layout of FIG. 17.

With reference now to FIG. 18, one implementation of the IR detector component 200 is illustrated therein. In the illustrated circuitry, the detector component 200 includes an infrared detector 250, which is preferably a lead sulfide detector. The detector 250 senses radiation and emits a signal. As the sensed radiation is being repeatedly broken with the chopping disk, the signal being emitted appears as a pseudo alternating current signal.

The signal is passed from the detector 250 to a first stage preamplifier 252 for amplification and filtering. The amplified signal then goes to a second stage preamplifier 254. Both preamplifiers 252, 254 have a high frequency filtration capability and a low frequency filtration capability. The preamplifiers 252, 254 preferably comprise any standard amplifier circuit having feedback capacitor filtering. Preferably, the secondary stage is switchable to selectively change the sensitivity of the device 30. The sensitivity of device 30 depends upon the total gain of the amplification. For example, the higher the gain, the more sensitive the device 30 and the lower the gain, the less sensitive the device 30.

The amplified signal then goes into an inverter chop system 256. As discussed above, the amplified signal is a pseudo alternating current signal and this system 256 rectifies the pseudo alternating current signal. The inverter chop system 256 preferably includes two switches that are synchronized to the rotation of the chopping disk. The switches invert the signal to rectify the signal. An amplifier 258 is then used to amplify the rectified signal.

The amplified and rectified signal is then passed through a Sallen-Key low pass filter 260 to strip a substantial portion of the high-frequency noise from the amplified and rectified signal. The filter 260 is preferably configured to cut off the high frequency noise (i.e., above 750 hertz). It is anticipated that any suitable low pass filter may be used to reduce the level of noise within the system.

After filtration by the low pass filter 260, the signal is passed to an A/D ("analog to digital) converter or a VCO (voltage controlled oscillator) 262. The VCO is a variable frequency oscillator that creates a variable pulse width output from the voltage signal input to it. As the amplitude of the input signal increases, the pulse width being output by the VCO 262 increases. Similarly, as the amplitude decreases, the pulse width emitted decreases. The VCO 262 then communicates with the microprocessor or CPU 202.

Figure 25:
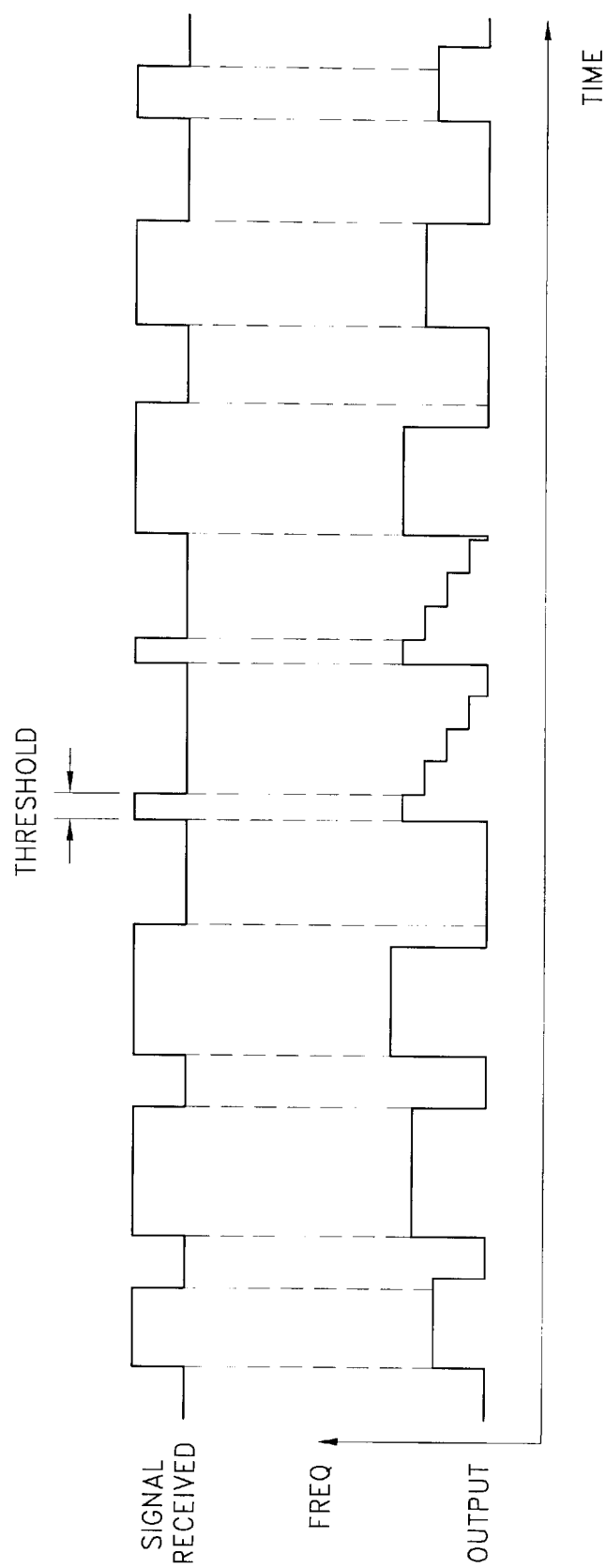
FIG. 25 is signal diagram illustrating an output signal in response to a signal received by the CPU.

As discussed above, the CPU 202 controls a number of output devices based upon the input from the A/D converter 262. Specifically, the pulse width of the A/D converter output is measured by the CPU 202 to determine what type of output is required. For instance, the CPU 202 instructs the audio circuitry how to vary the audible signal based upon the pulse width received. With reference to FIG. 25, if the pulse width received by the CPU 202 is indicative of a heat source rapidly passed by, such as during a rapid scan of an area, the CPU 202 may instruct the audio circuitry to rapidly ramp up in frequency to a high pitch and slowly ramp down in frequency from the high pitch. Moreover, the device may also simply hold on to any signal to allow the user time to adjust to the movement of the device. Thus, the device 30 will hold onto a detected signal and allow the operator to slowly return to the source. Such signal extending preferably occurs when the pulse width is below a threshold value which is set to the output of the sensor as calibrated at about 20 feet from a 200 degree surface. Of course, other calibration levels may also be used. Moreover, as will be recognized, the calibration of the sensor may vary with temperature or other ambient conditions.

Also, the device 30 may simply lock in on the increased pulse width and emit a single tone for a designated period of time, such as a half second. If the series of pulse widths being received indicates an increasing intensity of radiation, the CPU 202 will instruct the audio circuitry to slowly ramp up in frequency to indicate that the sensed radiation is increasing. Moreover, if the series of pulse widths being received indicates a decreasing intensity of radiation, the CPU 202 will instruct the audio circuitry slowly ramp down in frequency to indicate that the sensed radiation is decreasing. It is anticipated that other lock on strategies may also be employed to help an operator zero the device 30 in on a particular heat source.

As also discussed above, the audio circuitry 210 may include a visual indicator of the level of sensed radiation. For instance, with each audible pulse emitted, a light or other visual indicator, such as a light bar or digital read out, may be operated. In this manner, the device 30 may have utility in loud environments that decrease the ability to hear an audio signal.

While not illustrated, a laser diode driver may also be connected to the power source 36. The laser may be use as a pointer. The laser may be constantly on or may be turned on and off as desired. In some embodiments, the laser may turn on above a particular level of radiation and turn off below a particular level of radiation such that the power supply 36 may be more effectively conserved. The laser may also be used as part of a system to determine the distance to a heat source for determining a temperature of the heat source.

The CPU preferably is provided with sufficient power, even after shutdown to maintain the device in a sleep mode. The sleep mode allows the CPU to maintain vital operations as will be described below. The sleep mode may be accomplished in any suitable manner, such sleep modes being well known in the computer industry. Also, a communications link may be provided to the CPU for programming during manufacturing. Such a communications link allows values to be programmed into a memory, such as an EEPROM. The programming can be done for high and low sensitivity manually. This allows the unit to be tuned based upon characteristics for particular types of heat sources. It is envisioned that the device can be selectively configured and reconfigured by either the user or the manufacturer for various emergency response scenarios to help identify heat sources, such as body heat, flames, or smoldering ashes.

Figure 19:
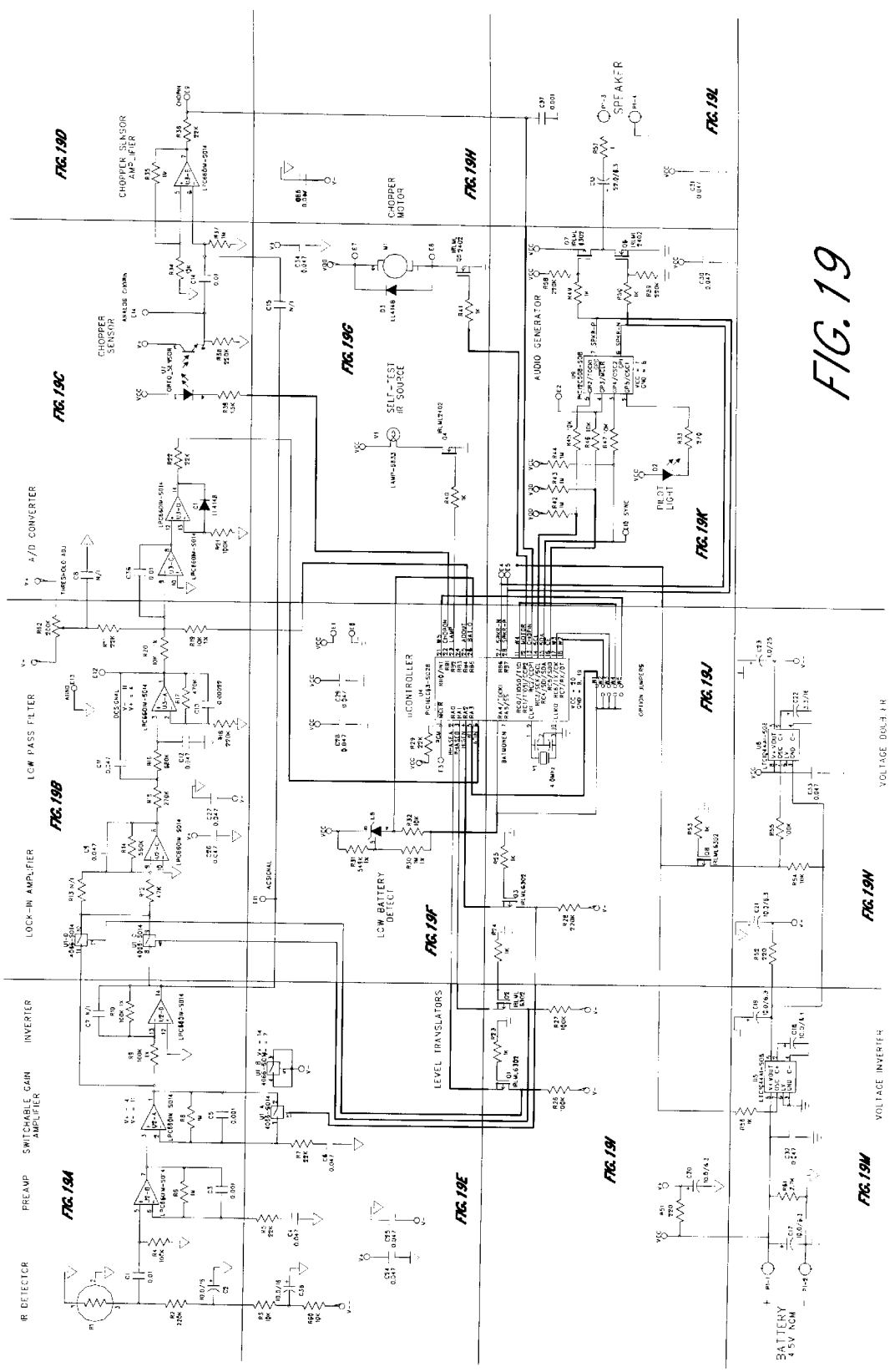
FIG. 19, comprising

With reference to FIG. 19, an exemplifying circuit is illustrated therein which is but one of many available implementations of the circuit schematic of FIG. 18. As will be recognized by those of ordinary skill in the art, other circuits may be used, including circuits that use application-specific logic in place of the microprocessor.

A second implementation of the IR detector component 200 is generally depicted in FIG. 19. In this implementation, the detector component 200 includes an infrared detector 300, which is preferably a lead sulfide detector. The detector 300 senses radiation and emits a signal. As the sensed radiation is repeatedly blocked with the chopping disk 171, the signal being emitted appears as a pseudo alternating current signal.

The signal is then passed through two computer controlled pre-amplification stages 302, 304. In the illustrated implementation, the stages 302, 304 are digital potentiometers that are included in a feedback loop to vary the gain by computer control. Digital drivers are preferably provided for each digital potentiometer such that a single digital driver controls the gain of the amps 302, 304 in the illustrated implementation. For instance, in case of a high-energy output from a source, the system can shut the gain down and adjust the gain accordingly for the output level. In the illustrated device 30, software accomplishes this function through the digital gain control. The illustrated arrangement allows the gain to go higher or lower depending upon the background energy level. This arrangement also allows the gain to be set based upon the specific sensor being employed for uniformity from one unit to the next. The amps 302, 304 preferably contain a high frequency filter element but may omit a low frequency filter in some configurations.

Another digital driver, which is preferably a portion of the digital potentiometer, preferably controls the rotational speed of the motor and the sensor voltage. As will be appreciated, the motor is continuously controlled in a manner to be described below while the sensor voltage may be varied depending upon the tolerances of the sensor actually used in the device 30. This variability advantageously reduces differences from unit to unit during manufacture and allows each device 30 to be tuned for uniformity of response.

Figure 20:
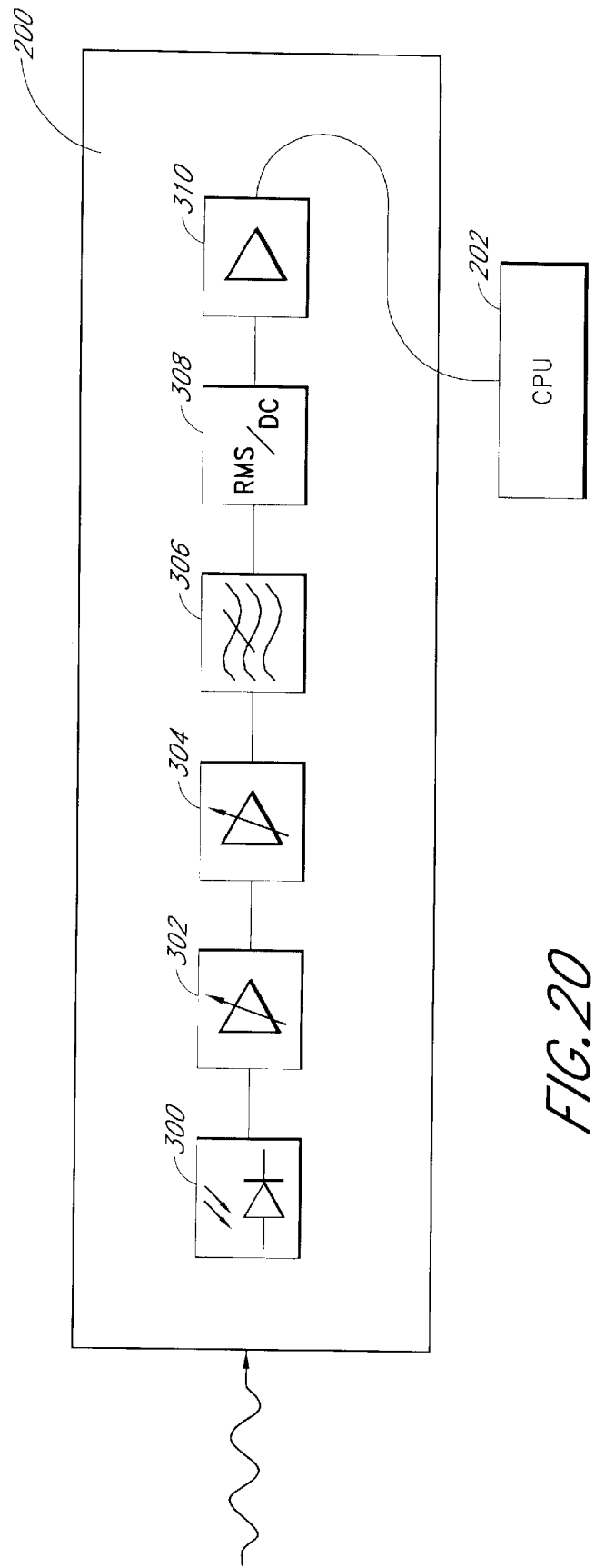
FIG. 20 is a more detailed block diagram of another infrared detector employed in the electrical layout of FIG. 17.

The output from the preamplifier stages 302, 304 passes through a Sallen Key low pass filter 306, which is preferably set to 750 Hz. The output from the filter 306 goes into a RMS-to-DC converter 308. The converter 308 preferably integrates and sums together the noise and the signal wave to produce a variable DC voltage output. Accordingly, the implementation illustrated in FIG. 20 advantageously reduces noise and false triggering as compared to the first implementation. In the circuit illustrated in FIG. 20, the output from the converter 308 varies between approximately 0 and 0.2 volts due to the configuration of the presently preferred converter 308.

The output from the converter 308 is then amplified in a buffer amplifier 310. The presently preferred amplifier 310 amplifies the signal by a factor of about 25 to produce an output signal that ranges between about 0 and about 5 volts. The range of the output advantageously corresponds to an input level for A/D converter 312. The A/D converter 312 is preferably a component of the CPU 202 in the second implementation. More preferably, the A/D converter is an eight-channel A/D converter. As with the first implementation above, the output from the A/D converter is used by the CPU 202 in controlling various output devices.

Figure 21A:
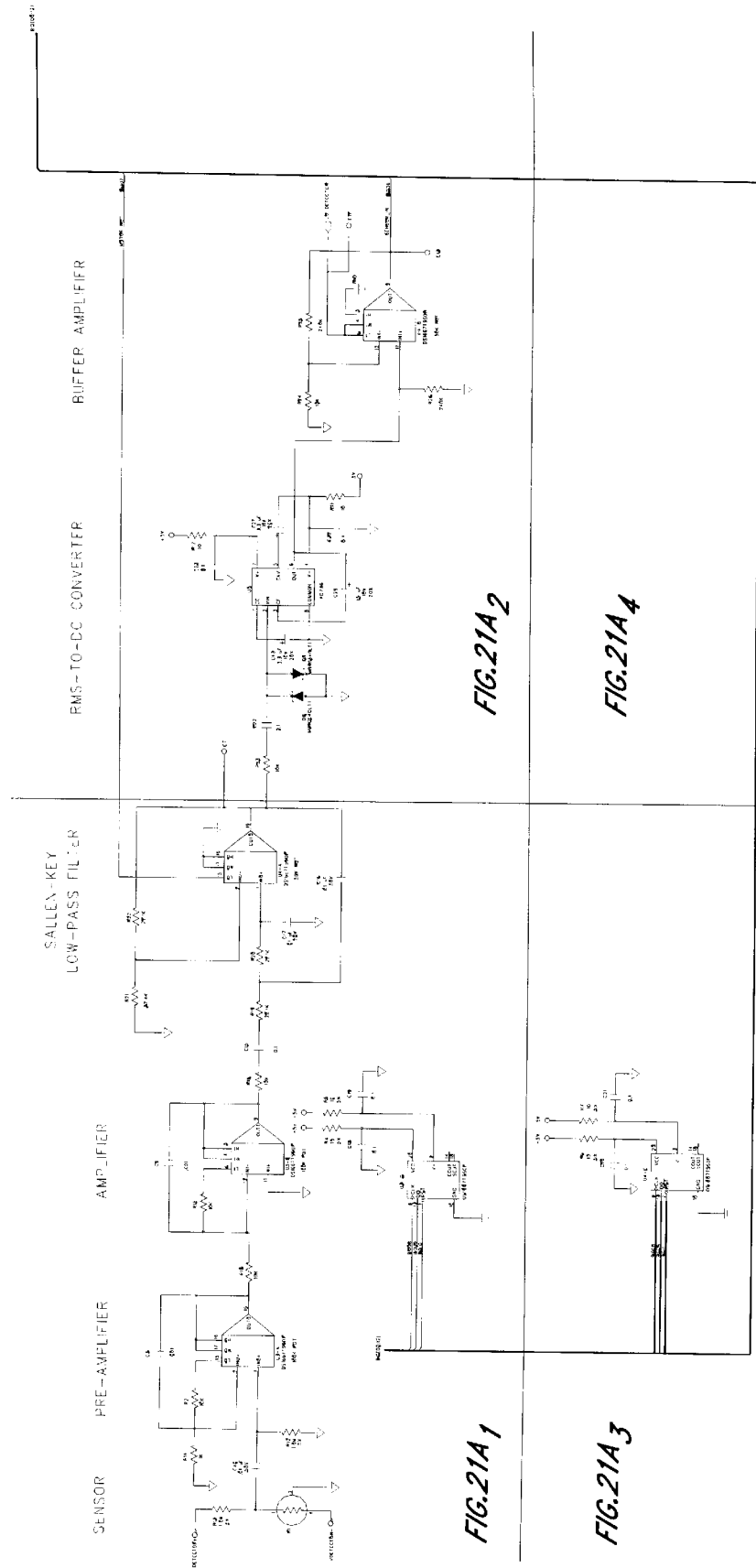
FIGS. 21A–21C, of which FIG. 21A comprises FIGS. 21A$_1$–21A$_4$, FIG. 21B comprises FIGS. 21B$_1$–21B$_{11}$ and FIG. 21C comprises FIGS. 21C$_1$–21C$_{19}$, are a detailed circuit diagram of one implementation of the block diagrams of FIGS. 17 and 20.
Figure 21B:
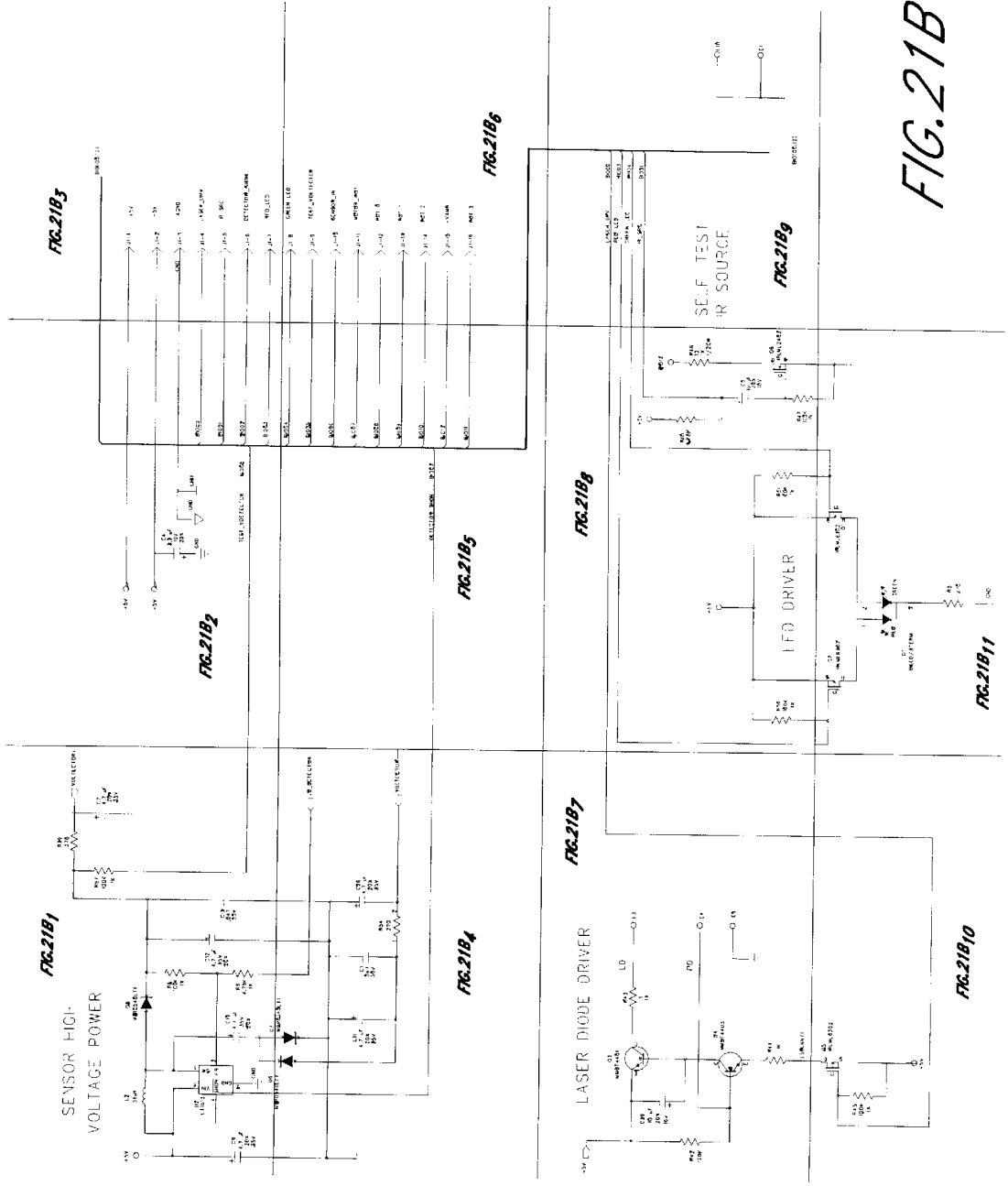
Figure 21C:
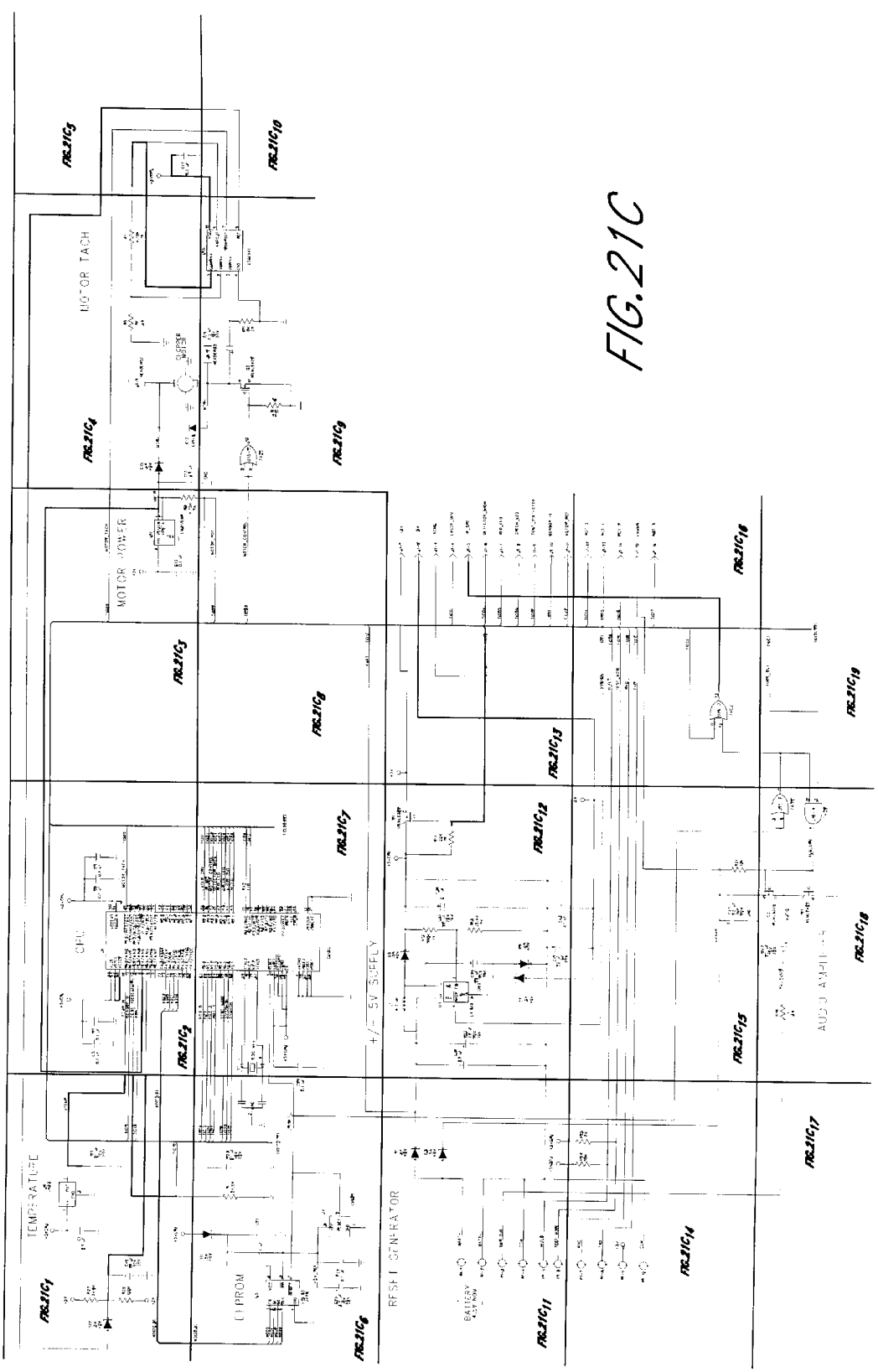

With reference now to FIGS. 21A–C, another exemplifying circuit is illustrated therein. As with the other circuit implementation, this is but one of many available implementations of the circuit schematic of FIG. 20. As will be recognized by those of ordinary skill in the art, other circuits may also be used to achieve the features, aspects or advantages of the illustrated schematic circuit.

Figure 22:
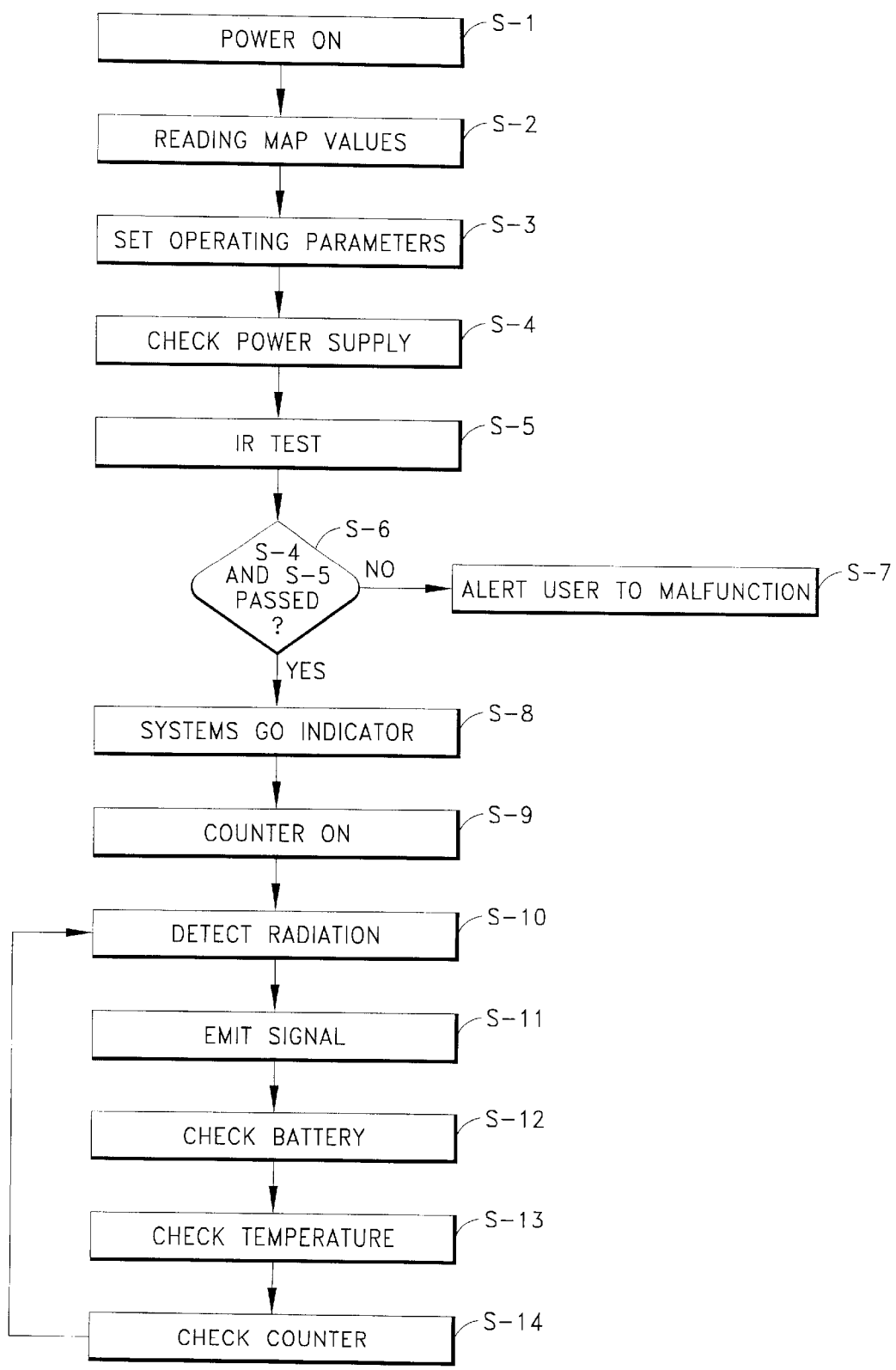
FIG. 22 is a flow diagram of a program sequence for use in a heat sensor.

With reference now to FIG. 22, a flow diagram is illustrated therein. The diagram details a control sequence 400 that may be used for the device 30. Specifically, the diagram depicts some of the interactions between various components discussed above. As illustrated, upon start up, at a step S-1, the power is turned on by a user. This step may be accomplished by depressing the push-button, or otherwise manipulating an on-off type of switch, of the illustrated device 30.

After power has been supplied, values are read from a memory location associated with the CPU 202 in a step S-2. For instance, values may be programmed into the memory location, such as an EEPROM, during manufacture and testing of the device 30. These values preferably reflect the level of gain preferred for a given infrared detector and a given ambient temperature, for instance. For example, it has been found that tolerance ranges found in serial production of the detectors result in differences in sensitivity; thus, the memory values are used to present the gain of the programmable amplifiers to a level that is substantially consistent from device 30 to device 30. Also, it has been found that the sensitivity of a given infrared detector varies according to the ambient temperature. For instance, the detector is much more sensitive in cold environments. Thus, the programmable memory allows a map of gains relative to ambient temperatures to be stored and accessed during use of the device 30. The values read from the map are initially a preset value for an average temperature and the read values may be varied while the device 30 is in use, depending upon temperature, for instance.

In a step S-3, operating parameters are set for the gain, the voltage supplied to the detector, and the speed of the motor. Some or all of these operating parameters, as discussed above, are subject to change during the operation of the device 30. Also, the voltage supply to the detector is varied due to manufacturing tolerances in the actual detector being employed. It is anticipated that the resistance may also be varied to accommodate such variations from detector to detector during serial production. Moreover, the initial values selected may be used to allow the device to begin operation and the values may then be fine-tuned to the actual operating conditions by the CPU 202.

The power supply is also checked in a step S-4. If the power supply is not adequately charged, one of two responses will occur. If the power supply level is too low, the device 30 will automatically shut down. If, however, the power supply level falls within an alert level, a low battery indicator is activated. The low battery indicator may be visual, audible, tactile or any combination of the three. In the presently preferred embodiment, the low battery indicator is a constantly sounding alarm that draws the operators attention to the operating condition of the power supply.

During a step S-5, a short burst of current is supplied to an IR emitter in a test of the sensory components 200. In one configuration, the IR sensor test device uses a light bulb while another IR sensor test device employs a stout ceramic resistor. The short burst of current will heat either the bulb or the resistor to a sufficient level that an infrared signal is emitted. The resistor has the added advantage that it will not burn out or break as easily as the light bulb. Additionally, the infrared radiation is supplied without any visual light being emitted.

The IR sensor test device allows the device 30 to check the operability of its infrared sensing capabilities in a step S-6. Should the device 30 fail the power supply test and the sensory test, then the user is alerted to the malfunction in a step S-7. For instance, a failed tone, vibration or display may be emitted or displayed or the unit may simply shutdown. Preferably, the device 30 will indicate what failed and maintain the indication for a sufficient time to allow the user to learn of the malfunction. Should the device 30 test positive for operability, a short audible, visual or tactile alert is provided in a step S-8. Presently, it is preferred that a series of tones be emitted having a steadily increasing frequency.

During a step S-9, the device begins a counter. The counter is preferably integrated with the microprocessor or CPU 202. The counter is set to count up or down a predetermined time period. The time period may be varied depending upon the application. For instance, in forest fire applications, the counter may be set to expire slightly before the battery life of a fully charged device 30. However, in other applications, such as routine fire fighting in building fires, the time may be set to count for about 60 minutes. Such a time period has been determined to be slightly longer than necessary for most building fire applications. It is also anticipated that the counter may only begin counting during periods in which signals are not detected above a predetermined threshold value. Such a configuration would allow the unit to shutdown if inadvertently left on after use.

The device 30 then enters into an operational loop. The illustrated loop maintains five main activities. In a step S-10, the loop constantly samples the incoming radiation through the above-described detector components 200. In a step S-11, the loop emits a signal (i.e., sound and/or light) based upon the detected radiation level. As described above, other signals may also be emitted in some applications. In a step S-12, the power supply is monitored for a low power supply condition, as described above. In a step S-13, the temperature is checked within the device 30 to determine if the gain requires adjustment based upon operating temperature. The step S-13 may also be used to adjust the gain if the level of radiation indicates that the gain should be increased or reduced for better performance of the device (i.e., increase the contrast between radiation levels detected). The device 30 also checks the counter to determine whether the predetermined period has expired. This loop may contain more or less steps and some of the checks (i.e., temperature, counter, and battery) may be performed less frequently if desired. Also, the CPU 202 preferably contains a reset function which allows the device 30 to be reset in the event the CPU is not reported to by one of the steps for an extended period of time.

In the event the predetermined period being tracked by the counter expires, the device 30 is preferably programmed to emit a lost device signal. For instance, the device may emit a loud audible tone to help a user find the possibly misplaced device. Preferably, the device 30 is programmed to emit such a lost device signal for a predetermined period. Such a period may last from five minutes to two hours in some applications. In a presently preferred device 30, the device 30 emits a lost device tone for approximately 15 minutes before shutting itself down to conserve a portion of its power supply. Also, the device may intermittently turn on and emit the signal for subsequent predetermined periods to aid in locating the device after long blazes or other time consuming events have occurred. It is anticipated that some locating technologies which rely upon the global positioning system may also be used to help locate a lost device.

Figure 23:
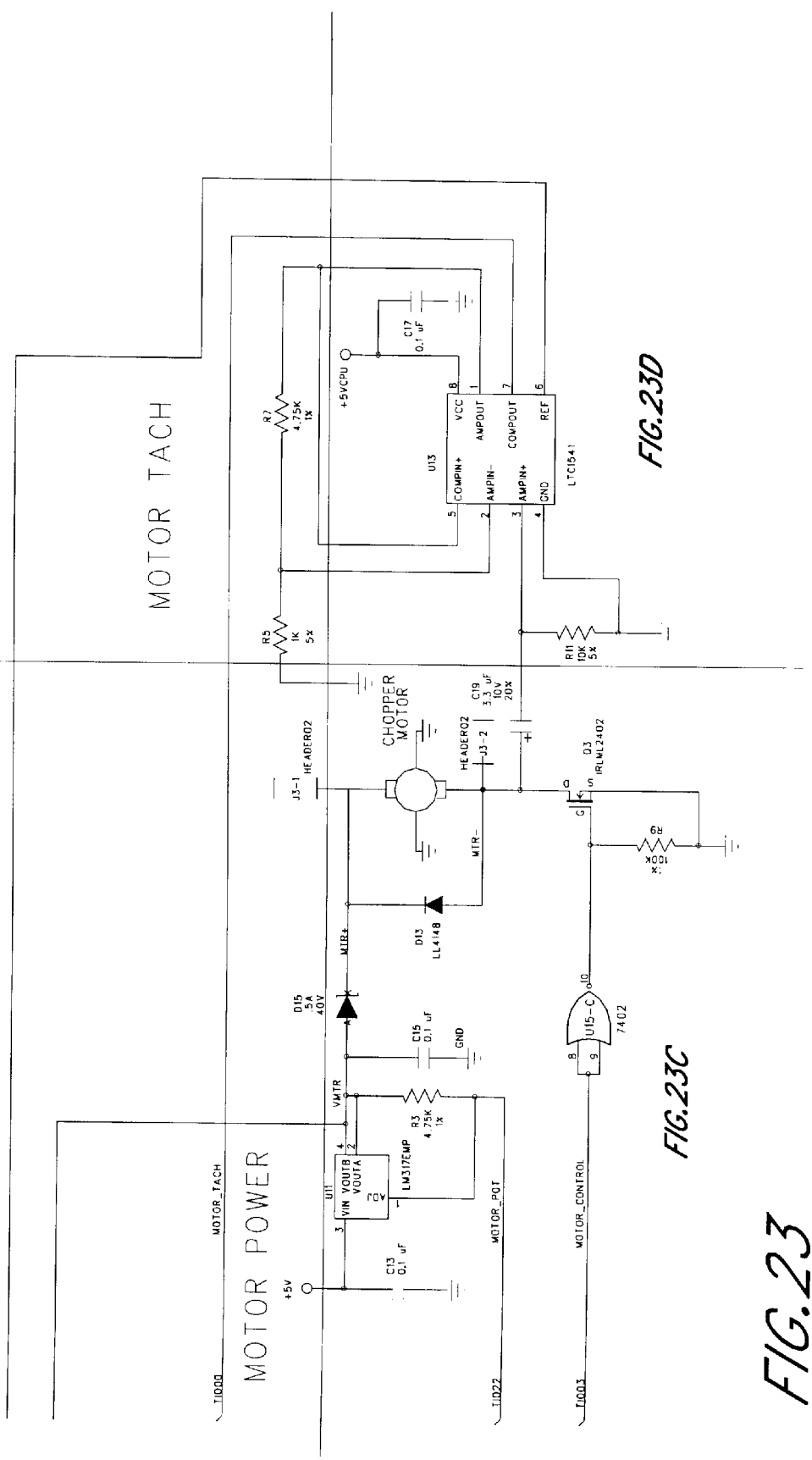
FIG. 23, which comprises

With reference now to FIG. 23, a method of controlling an electric motor for substantially constant speed without the need for a sensor-type tachometer will be described. Preferably, the present method will be used with permanent motors that are rotating at substantially constant speeds. Of course, other applications may become readily apparent to those of ordinary skill in the art in view of this disclosure.

As illustrated, a motor (FIG. 23C) is connected to a power supply through the illustrated circuit 500 at the connections 502 and 504. Accordingly, to turn the motor, voltage is applied through the circuit 500. The circuit 500 preferably includes a FET transistor drive circuit 506. As the motor is being driven by the applied voltage, the motor operates as a motor and spins an output shaft. The motor speed is controllable using microprocessor 508, a regulator 510 and digital potentiometer 512 which are connected to the circuit 500.

When power is removed from the motor, the motor outputs energy, either as a generator or as a result of the residual energy built up within the motor. This energy appears as an output sine wave. A low pass filter 514 is connected between the motor and a comparator 516. The comparator 516, in turn, is connected to the microprocessor 508 to detect the output sine wave.

Figure 24:
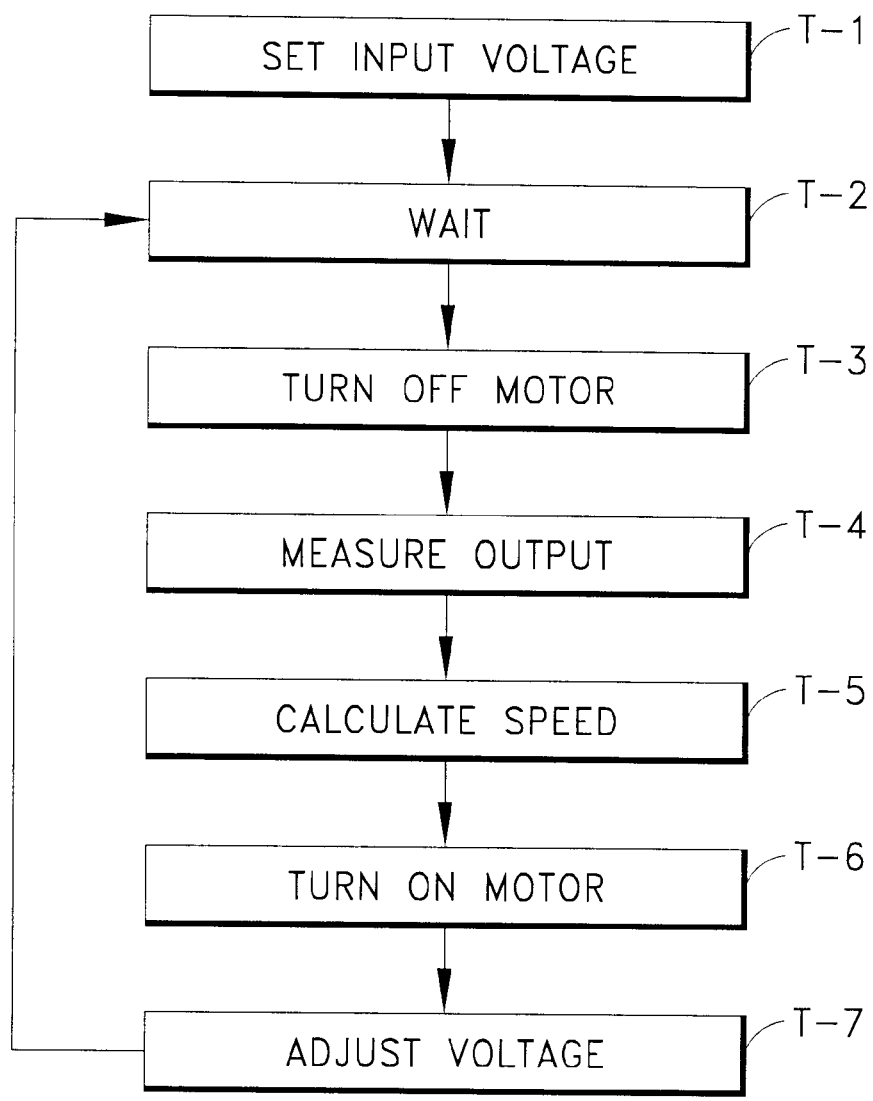
FIG. 24 is a flow diagram of a motor control routine.

With reference now to FIG. 24, a flowchart of an exemplifying embodiment of a motor speed control is illustrated. In this control system, during a step T-1, the microprocessor 508 sets the digital potentiometer 512 to a predetermined voltage setting. The setting, in turn, causes the regulator 510 to drive the motor at a predetermined target speed. After a period of time sufficient to allow the motor to attain the predetermined target speed has elapsed during a step T-2, the microprocessor 508 shuts off the motor through the FET switch 506 during a step T-3. Preferably, power is removed from the motor for a period of between about 10 milliseconds and about 100 milliseconds. More preferably, the power is removed from the motor for a period of between about 30 milliseconds and about 80 milliseconds. In one embodiment, the power is removed from the motor for a period of about 50 milliseconds. This interruption period may vary according to the application and may exceed these ranges in some applications (i.e., high inertia applications).

In a step T-4, the microprocessor 508 measures the frequency of the output sine wave. Preferably, the frequency is measured by monitoring the output of the comparator 516. The microprocessor 508 then turns the motor back on through the FET switch 506 in a step T-5. The actual speed of the motor during the slight spin down can be calculated by observing the period of the output pulse. The degree of speed loss of the motor during the slight spin down depends upon the inertial forces, the load and other factors. Such variables may be accounted for based upon their effect upon the system. In the present device 30, such variable have a negligible effect upon motor speed. Depending upon the motor speed calculated, the voltage to the motor is adjusted in a step T-7 by altering the voltage supply with the digital potentiometer 512 and regulator 510 pair. The loop is then repeated. It is anticipated that some of the steps may be interchanged depending upon the application and the speed of the microprocessor or other circuit being used.

The above-described motor control allows the speed of a motor to be monitored and adjusted such that a substantially constant speed may be maintained. It is also anticipated that the above-described motor control can accomplish speed control for variable speeds as determined necessary by the microprocessor. The control allows the motor speed to be monitored and control without the complication of an external tachometer. Specifically, because stray infrared signals may false trip the present device 30, the above-described motor control advantageously removes the need to use an emitter and detector pairing to monitor and control motor speed. Thus, internal shielding may be reduced to some degree. Moreover, less space on the circuit board is occupied by the pairing; thereby simplifying the present device 30 over earlier test configurations.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Also, some of the components may be formed in the leash housing itself, such as the bag carrier, and bosses may be formed in the housing for rings and the like. Moreover, not all of the features, aspects and advantages are necessarily required to practice the present invention. Accordingly, the scope of the present invention is intended to be defined only by the claims that follow.

What is claimed is:

1. A method of detecting infrared radiation, the method comprising:

supplying power to a heat detecting device having an infrared detector assembly;

reading preset values from a memory location into a microprocessor;

setting a gain for the infrared detector assembly based upon the preset values;

checking a power supply for the device;

testing the infrared detector assembly;

alerting a user to the operability of the infrared detector assembly;

activating a timer;

using the infrared detector assembly to at least intermittently sample radiation;

emitting a signal indicative of a level of radiation sampled; and checking an ambient temperature of the infrared detector assembly.

2. The method of claim 1, wherein the gain setting is performed intermittently while the radiation is sampled.

3. The method of claim 1, wherein the gain setting is performed after checking the ambient temperature.

4. The method of claim 1, wherein the power supply checking is performed intermittently while the radiation is sampled.

5. The method of claim 4, wherein checking the ambient temperature is also performed intermittently while the radiation is sampled.

6. The method of claim 1, wherein the power is turned off after the time has reached a predetermined period of time.

7. The method of claim 1 further comprising activating a second timer after the first timer has reached a predetermined period of time, a lost device alarm being signaled while the second timer is activated.

8. A method detecting infrared radiation, the method comprising:

supplying power to a heat detecting device having an infrared detector assembly;

setting a gain for the infrared detector assembly;

checking a power supply for the device;

testing the infrared detector assembly;

alerting a user to the operability of the infrared detector assembly;

activating a timer;

using the infrared detector assembly to at least intermittently sample radiation;

emitting a signal indicative of a level of radiation sampled and expanding a spike signal reflecting a fleeting detection of infrared radiation.

9. The method of claim 8 further comprising checking an ambient temperature of the infrared detector assembly.

10. The method of claim 9 further comprising obtaining preset values into memory, which values are used when setting the gain for the infrared detector assembly.

11. The method of claim 10 further comprising activating a systems go indicator after alerting the user to the operability of the infrared detector assembly.

12. The method of claim 11, wherein the user is alerted by audible signals.

13. The method of claim 8, wherein the power supply is checked intermittently during operation of the device.

14. The method of claim 8, wherein the ambient temperature of the device is intermittently checked.

15. The method of claim 8, wherein the gain setting is performed intermittently while the radiation is sampled.

16. The method of claim 8, wherein the gain setting is performed after checking the ambient temperature.

17. The method of claim 8, wherein the power is turned off after the time has reached a predetermined period of time.

18. The method of claim 17 further comprising activating a second timer after the first timer has reached a predetermined period of time, a lost device alarm being signaled while the second timer is activated.

19. The method of claim 18, wherein the lost device alarm is intermittently emitted.

20. The method of claim 18, wherein the lost device alarm is emitted for a second predetermined period that is signified by the second timer and the device shutting itself down after the second predetermined period has expired.

* * * * *